(12) United States Patent
Fujisawa et al.

(10) Patent No.: US 11,974,529 B2
(45) Date of Patent: May 7, 2024

(54) CULTIVATION EQUIPMENT

(71) Applicant: Fujisawa Kenki Co., Ltd., Mie (JP)

(72) Inventors: Hisafumi Fujisawa, Mie (JP); Eiji Higuchi, Mie (JP); Osamu Hirata, Mie (JP)

(73) Assignee: Fujisawa Kenki Co., Ltd., Mie (JP)

(*) Notice: Subject to any disclaimer, the term of this patent is extended or adjusted under 35 U.S.C. 154(b) by 0 days.

(21) Appl. No.: 17/607,677

(22) PCT Filed: Apr. 28, 2021

(86) PCT No.: PCT/JP2021/016902
§ 371 (c)(1),
(2) Date: Oct. 29, 2021

(87) PCT Pub. No.: WO2022/024485
PCT Pub. Date: Feb. 3, 2022

(65) Prior Publication Data
US 2023/0148499 A1 May 18, 2023

(30) Foreign Application Priority Data
Jul. 27, 2020 (JP) ................. 2020-126862

(51) Int. Cl.
*A01G 31/06* (2006.01)
*A01G 9/08* (2006.01)
(Continued)

(52) U.S. Cl.
CPC ............. *A01G 31/06* (2013.01); *A01G 9/088* (2013.01); *A01G 9/247* (2013.01); *B25J 5/02* (2013.01); *A01G 2031/006* (2013.01)

(58) Field of Classification Search
CPC ......... A01G 31/06; A01G 9/247; A01G 9/088
See application file for complete search history.

(56) References Cited

U.S. PATENT DOCUMENTS

| 8,443,849 | B2 * | 5/2013 | Rosselli | A01G 25/00 |
| | | | | 137/78.2 |
| 2006/0162253 | A1 * | 7/2006 | Nilsson | A01G 9/247 |
| | | | | 47/79 |

(Continued)

FOREIGN PATENT DOCUMENTS

| CA | 3097969 A1 * | 10/2019 | ............. A01G 31/04 |
| CH | 697385 B1 * | 9/2008 | ............. A01G 22/15 |

(Continued)

OTHER PUBLICATIONS

International Search Report (ISR) dated Jul. 20, 2021 filed in PCT/JP2021/016902.

(Continued)

*Primary Examiner* — Monica L Perry
*Assistant Examiner* — Katherine Anne Kloecker
(74) *Attorney, Agent, or Firm* — RANKIN, HILL & CLARK LLP

(57) ABSTRACT

An object of the present invention is to propose cultivation equipment that can curb complication and upsizing of the equipment even when the number of cultivation stages is increased. Cultivation equipment includes a storage shelf (1) and a plurality of cultivation tanks (3) that are stored in the storage shelf (1) and hold plants (P1) and a cultivation liquid (L1). The cultivation equipment further includes a discharge device (50) and a supply device (51). The discharge device (50) is movable among a plurality of cultivation tanks (3), and discharges the cultivation liquid (L1) from each of the plurality of cultivation tanks (3). The supply device (51) is movable among the plurality of cultivation tanks (3), and supplies the cultivation liquid (L1) to each of the plurality of cultivation tanks (3).

12 Claims, 14 Drawing Sheets

(51) Int. Cl.
  *A01G 9/24* (2006.01)
  *A01G 31/00* (2018.01)
  *B25J 5/02* (2006.01)

(56) References Cited

U.S. PATENT DOCUMENTS

| | | |
|---|---|---|
| 2013/0305601 A1 | 11/2013 | Park |
| 2015/0282437 A1* | 10/2015 | Ohara ................... A01G 9/247 47/66.6 |
| 2021/0204499 A1 | 7/2021 | Fujisawa et al. |
| 2021/0212270 A1* | 7/2021 | Booker-Ogunde .... A01G 31/06 |
| 2022/0007589 A1* | 1/2022 | Binney ................ G06T 7/0012 |
| 2022/0110270 A1* | 4/2022 | Bidram ................ A01G 9/088 |

FOREIGN PATENT DOCUMENTS

| | | | |
|---|---|---|---|
| CN | 102640679 A | 8/2012 | |
| CN | 104853588 A | 8/2015 | |
| CN | 110637647 A | 1/2020 | |
| JP | 3-232434 A | 10/1991 | |
| JP | 11-275993 A | 10/1999 | |
| JP | 2012-200222 A | 10/2012 | |
| JP | 2014-76015 A | 5/2014 | |
| JP | 2017-63713 A | 4/2017 | |
| JP | 2018-93734 A | 6/2018 | |
| JP | 2020-10645 A | 1/2020 | |
| KR | 101022025 B1 * | 3/2011 | |
| KR | 102088593 B1 * | 3/2020 | ............. A01G 18/62 |

OTHER PUBLICATIONS

Chun, "Production Plants using Artificial Light for Growing Uniform and High Quality Transplants", Journal of the Illuminating Engineering Institute of Japan, 2001, vol. 85, No. 3, pp. 213-216, total 9 pages; Cited in ISR & JPOA; English machine translation.
Japanese Office Action (JPOA) dated Nov. 17, 2020 for corresponding Japanese Patent Application No. 2020-126862; English machine translation.

* cited by examiner

FIG. 8
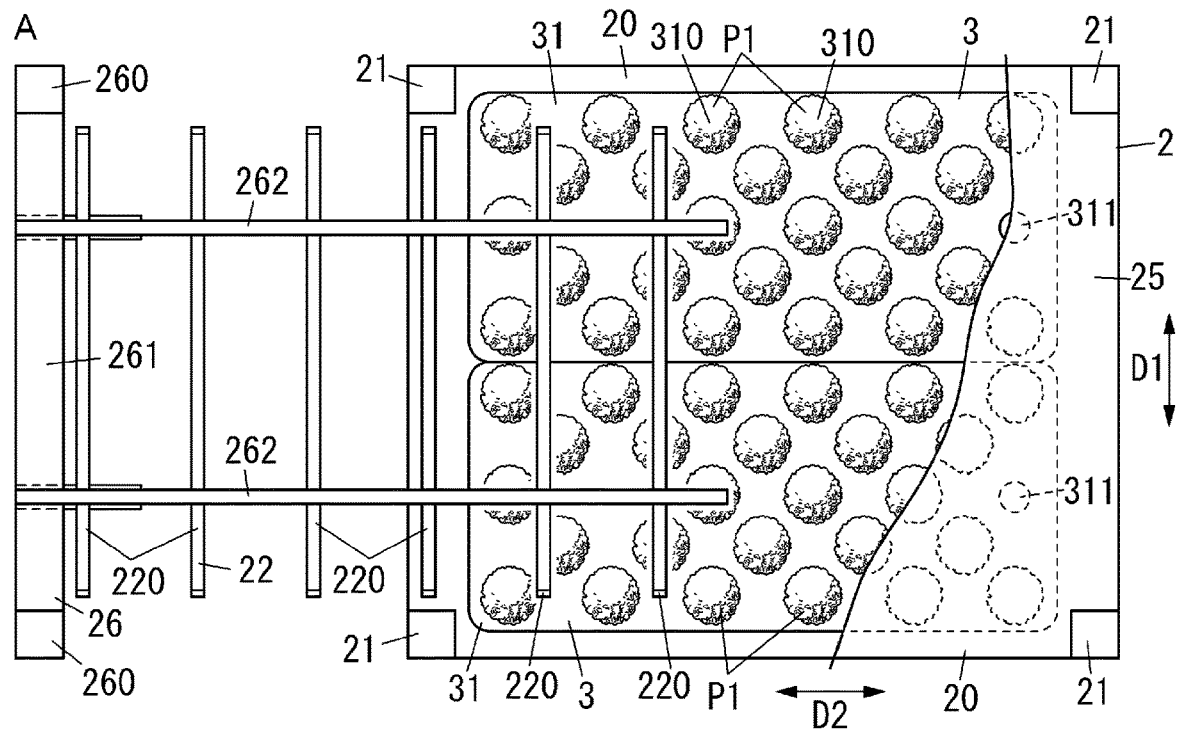
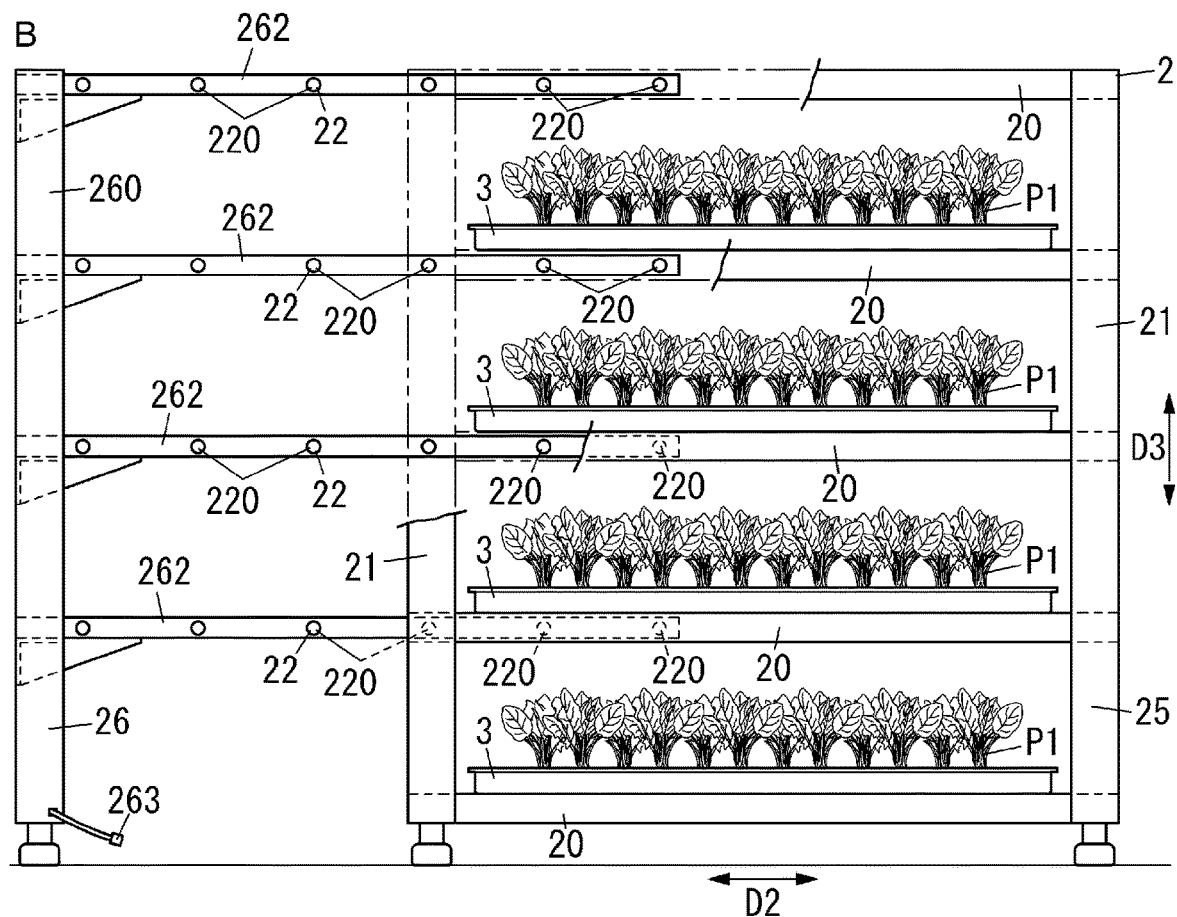

CULTIVATION EQUIPMENT

TECHNICAL FIELD

The present disclosure relates to cultivation equipment.

BACKGROUND ART

Patent Literature 1 describes a multistage plant cultivation apparatus including a cultivation bed installed in each stage, a nourishing liquid necessary for the growth of plants circulating in the cultivation bed.

Incidentally, in the multistage plant cultivation apparatus described in Patent Literature 1, it is necessary to increase the number of stages in order to increase the harvest amount per unit area.

However, when the number of stages is increased, the number of pipes for supplying and discharging the nourishing liquid to and from the cultivation bed is increased, and thus there is a possibility that equipment for plant cultivation becomes complicated. Moreover, in order to supply the nourishing liquid to a cultivation bed on a high stage, a thick pipe or a large-capacity pump is required. This may lead to upsizing of the equipment for plant cultivation.

CITATION LIST

Patent Literature

Patent Literature 1: JP H03-232434 A

SUMMARY OF THE INVENTION

An object of the present disclosure is to propose cultivation equipment that can curb complication and upsizing of the equipment even when the number of cultivation stages is increased.

Cultivation equipment according to one aspect of the present disclosure includes: a storage shelf; a plurality of cultivation tanks that are stored in the storage shelf and hold plants and a cultivation liquid; a discharge device that is movable among the plurality of cultivation tanks and discharges the cultivation liquid from each of the plurality of cultivation tanks; and a supply device that is movable among the plurality of cultivation tanks and supplies the cultivation liquid to each of the plurality of cultivation tanks.

BRIEF DESCRIPTION OF THE DRAWINGS

FIG. 8A is a plan view illustrating Modification 2 of a cultivation unit included in the cultivation equipment, and FIG. 8B is a side view illustrating Modification 2 of the cultivation unit.

DESCRIPTION OF THE EMBODIMENTS

1. Embodiment 1

1.1 Overview

Figure 1:
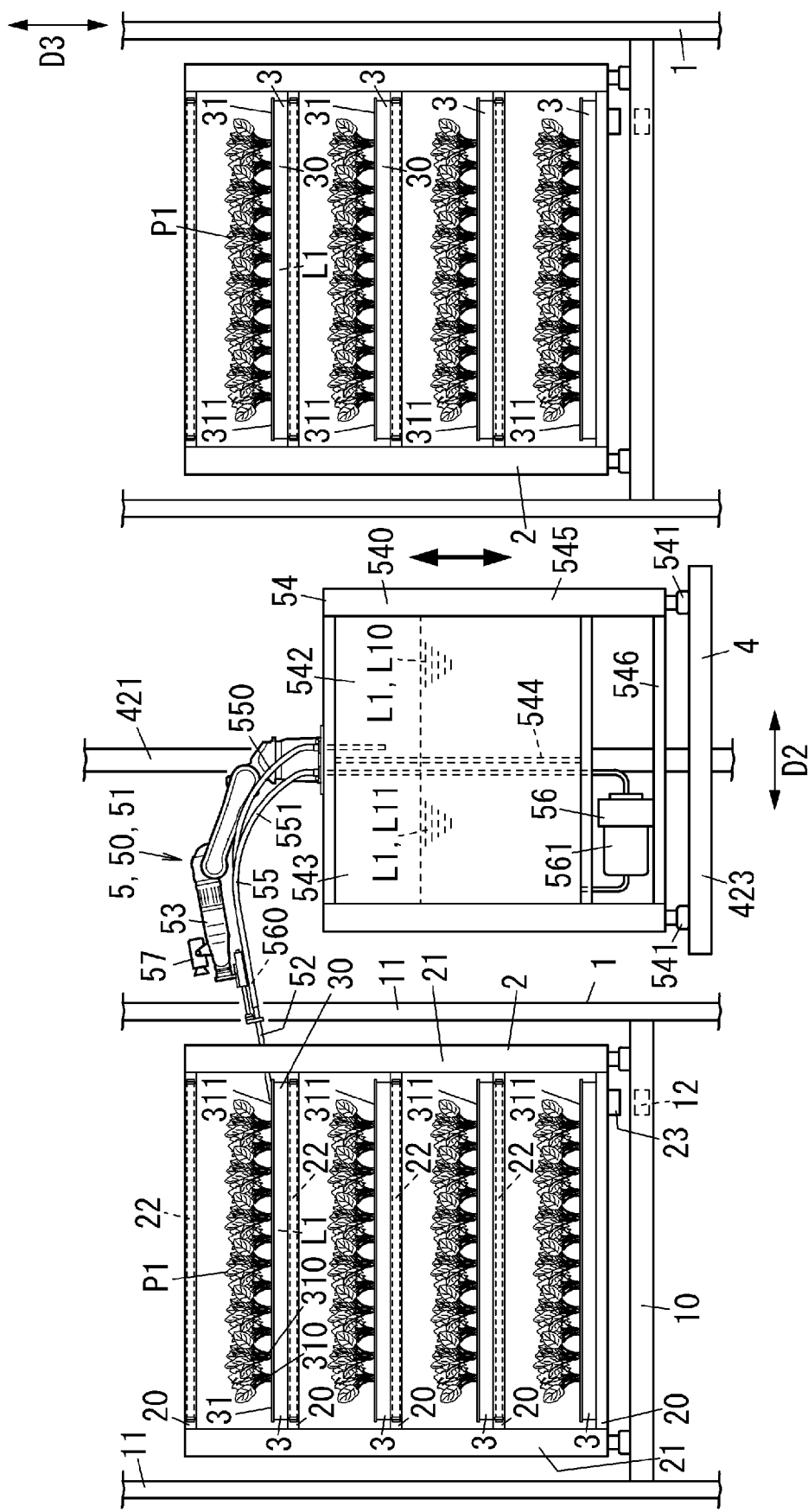
FIG. 1 is a front view schematically illustrating a main part of cultivation equipment of Embodiment 1 according to the present disclosure.

FIG. 1 schematically illustrates a main part of cultivation equipment of Embodiment 1. The cultivation equipment includes storage shelf 1, a plurality of cultivation units 2 stored in the storage shelf 1, and a plurality of cultivation tanks 3 installed in the plurality of cultivation units 2 and holding plants P1 and a cultivation liquid L1. The cultivation equipment further includes a discharge device 50 and a supply device 51. The discharge device 50 is movable among the plurality of cultivation tanks 3, and discharges the cultivation liquid L1 from each of the plurality of cultivation tanks 3. The supply device 51 is movable among the plurality of cultivation tanks 3, and supplies the cultivation liquid L1 to each of the plurality of cultivation tanks 3.

In the cultivation equipment having the above configuration, the discharge device 50 and the supply device 51 which are movable among the plurality of cultivation tanks 3 can discharge and supply the cultivation liquid L1 to and from each of the plurality of cultivation tanks 3 of the plurality of cultivation units 2 stored in the storage shelf 1. For this reason, in this cultivation equipment, there is no need to install a large number of pipes for supplying and discharging the cultivation liquid L1 on the storage shelf 1. Hence, it is possible to prevent complication and upsizing of the equipment, so that the storage shelf 1 is easily increased in height, and the harvest amount per unit area is easily increased.

Additionally, in this cultivation equipment, when the cultivation unit 2 is conveyed between a work station A1 for performing various works and the storage shelf 1, the plurality of cultivation tanks 3 of the cultivation unit 2 can be kept in a state where the cultivation tanks 3 do not contain or substantially do not contain the cultivation liquid L1. Accordingly, with this cultivation equipment, the weight of the cultivation unit 2 at the time of conveyance can be reduced, the load of conveyance can be reduced, and also liquid leakage from each cultivation tank 3 at the time of conveyance can be prevented.

1.2 Details

Figure 2:
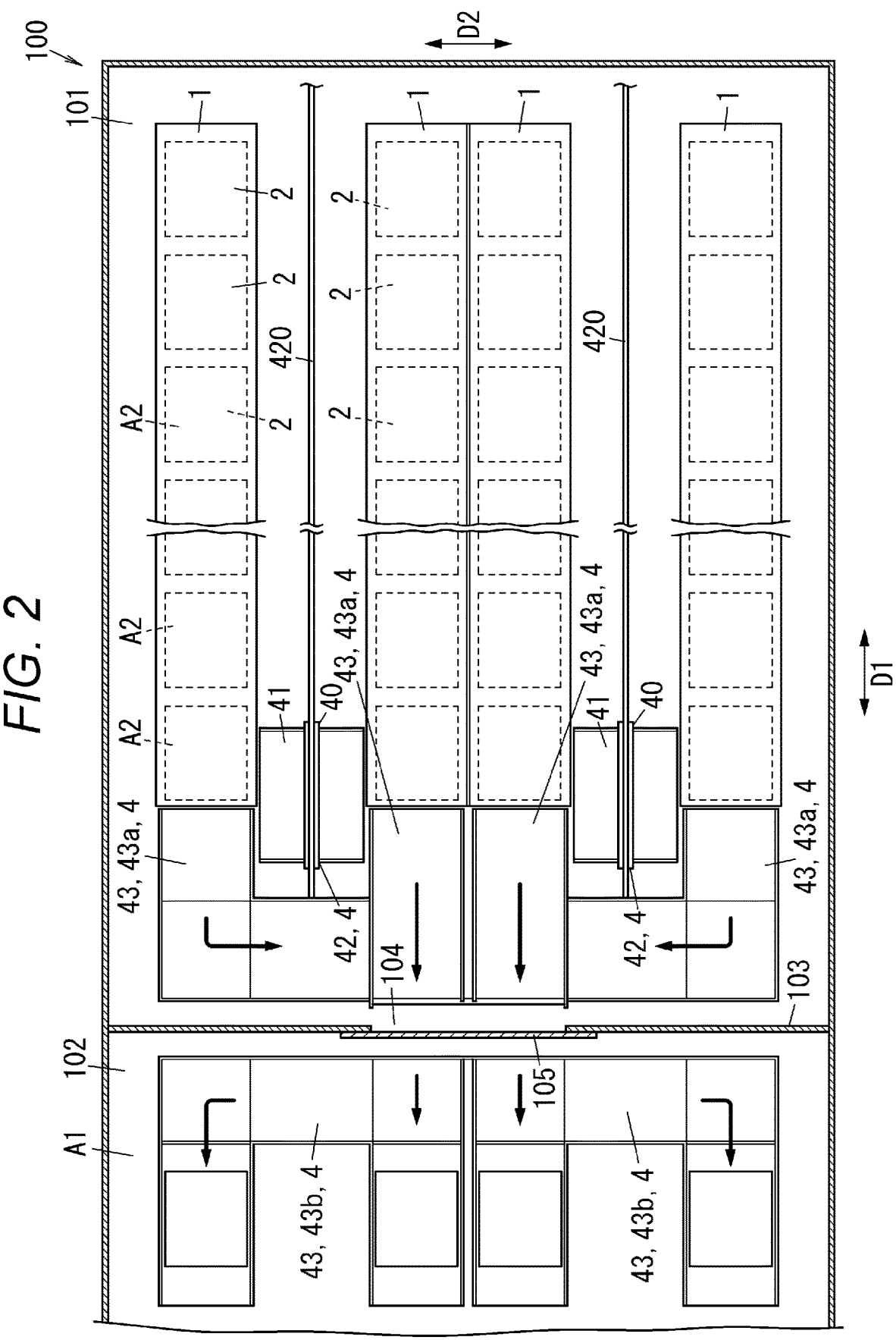
FIG. 2 is a plan view schematically illustrating a cultivation building in which the cultivation equipment is installed.

Next, the cultivation equipment of the present embodiment will be described in more detail. The cultivation equipment is equipment for hydroponically cultivating the plant P1 to be cultivated. The cultivation equipment of the present embodiment further includes a conveyance device 4 that conveys at least one of the plurality of cultivation units 2 between the storage shelf 1 and the work station A1 separated from storage shelf 1. The discharge device 50 and the supply device 51 are conveyed by the conveyance device 4. As illustrated in FIG. 2, the cultivation equipment is installed in a cultivation building 100. In the present embodiment, the cultivation equipment includes the storage shelf 1 long in one horizontal direction. Hereinafter, each configuration will be described with the longitudinal direction of the storage shelf 1 in the horizontal direction as direction D1, the short direction of the storage shelf 1 in the horizontal direction as direction D2, and the height direction of the storage shelf 1, that is, the vertical direction thereof as direction D3.

1.2.1 Cultivation Building

As illustrated in FIG. 2, the cultivation building 100 includes a cultivation room 101 and a work room 102. The work room 102 is a room different from the cultivation room 101 separated by a wall 103.

In the present embodiment, the cultivation building 100 includes a plurality of work rooms 102 arranged in direction D3, that is, in the vertical direction. The cultivation room 101 is one room having a height similar to the total height of the plurality of work rooms 102.

The cultivation room 101 is a room for cultivating the plant P1, and the storage shelf 1 is installed in cultivation room. The environment of the cultivation room 101 is set to a temperature and humidity suitable for cultivation of the plant P1, for example.

The work room 102 is a room for performing various works such as planting, harvesting, cleaning, and inspecting on the plurality of cultivation tanks 3 of the cultivation unit 2 conveyed to the work room 102. A space in the work room 102 is the work station A1. In the plurality of work rooms 102, a different work is performed in each room, for example.

The wall 103 is provided with an entrance 104 that connects the cultivation room 101 and the work room 102 on each floor. In the present embodiment, the cultivation room 101 and the work room 102 on each floor are connected to each other through one entrance 104. That is, the wall 103 is provided with the same number of entrances 104 as the number of the plurality of work rooms 102.

The cultivation building 100 includes a plurality of automatic doors 105 that open and close the plurality of entrances 104 in the wall 103. Each automatic door 105 opens the entrance 104 only when the cultivation unit 2 moves between the cultivation room 101 and the work room 102, and closes the entrance 104 at other times. As a result, in the cultivation building 100, the environment in the cultivation room 101 can be easily maintained under conditions suitable for cultivation of the plant P1. That is, the temperature and humidity in the cultivation room 101 can be easily kept constant, and the air in each work room 102 can be prevented from flowing into the cultivation room 101.

The conveyance device 4 moves the cultivation unit 2 between the cultivation room 101 and the work room 102.

1.2.2 Storage Shelf

Figure 3:
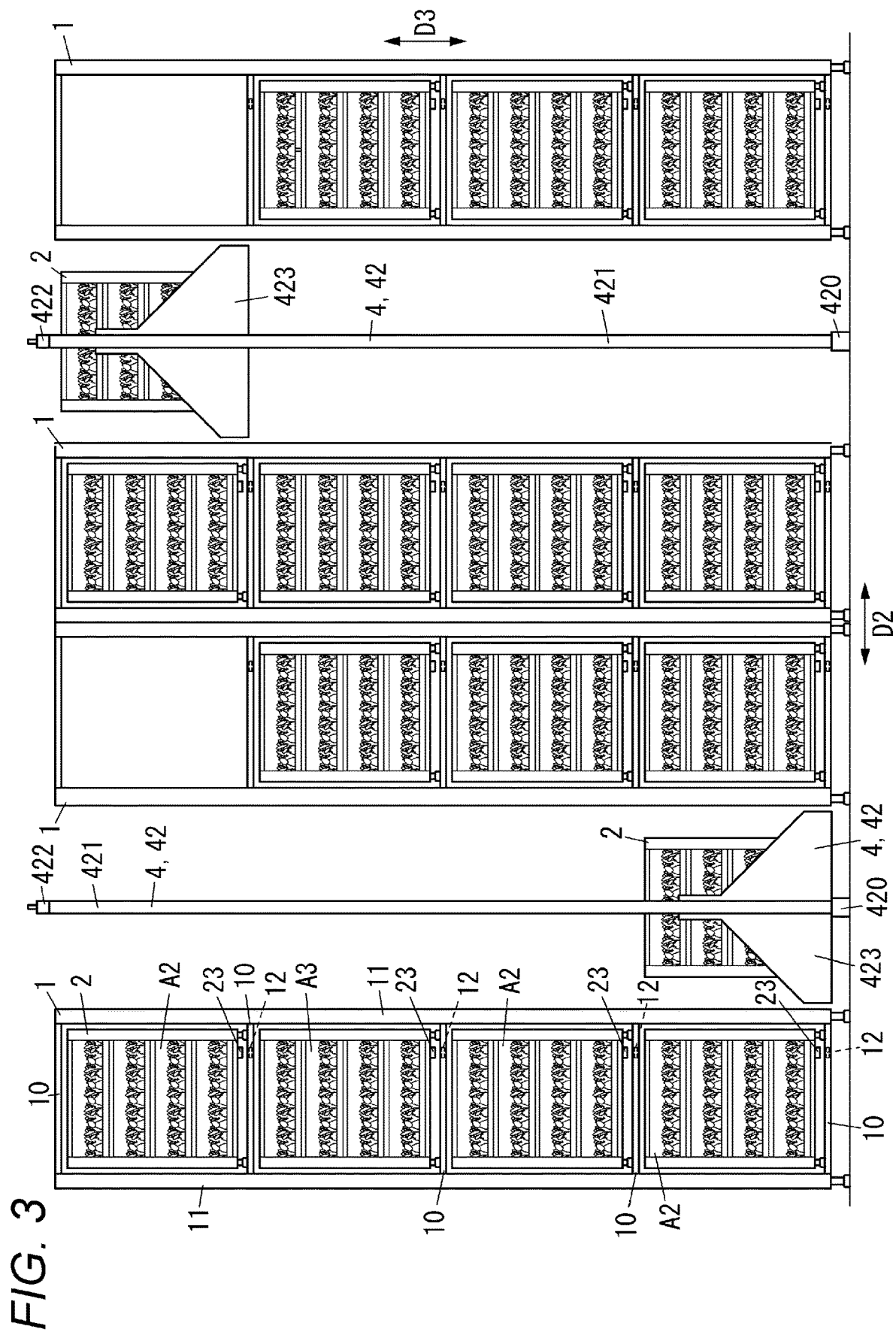
FIG. 3 is a front view schematically illustrating the cultivation equipment.

As illustrated in FIGS. 2 and 3, the cultivation equipment includes a plurality of storage shelves 1. The plurality of storage shelves 1 are arranged at intervals in direction D2 and are parallel to each other. The plurality of storage shelves 1 include a plurality of sets of a pair of storage shelves 1 positioned across a conveyance passage of the cultivation unit 2 from each other. A set of the pair of storage shelves 1 and another set of the pair of storage shelves 1 arranged in direction D2 are positioned adjacent to each other, that is, with a narrower interval than the conveyance passage. The number of storage shelves 1 included in the cultivation equipment is appropriately set according to the area of the cultivation room 101 and the like.

Figure 4:
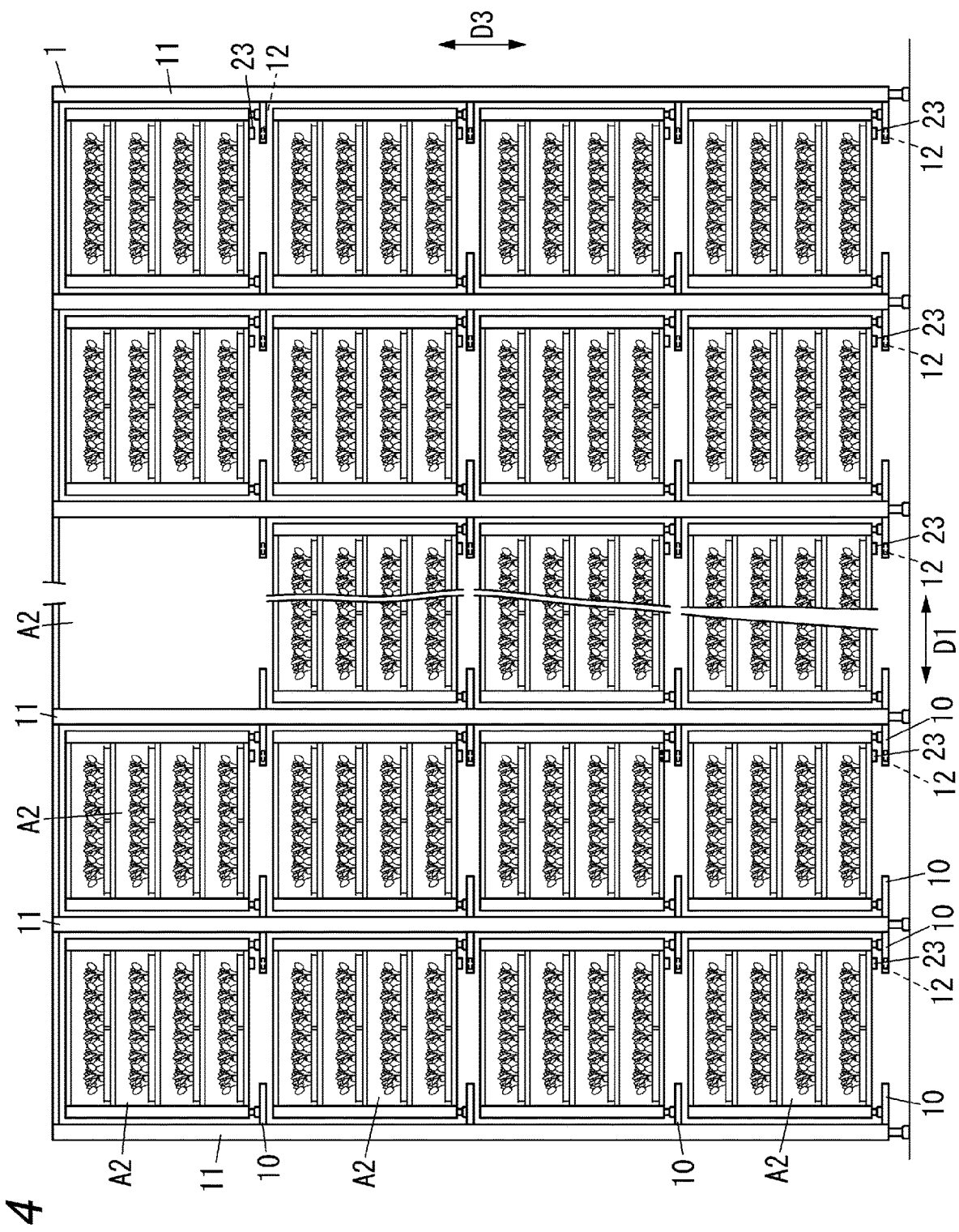
FIG. 4 is a side view schematically illustrating the cultivation equipment.

As illustrated in FIGS. 3 and 4, the storage shelf 1 is a multistage shelf having a plurality of shelf members 10 arranged at intervals in direction D3, that is, the vertical direction. The storage shelf 1 further includes a plurality of columns 11 that support the plurality of shelf members 10. The plurality of shelf members 10 and the plurality of columns 11 are both made of metal, for example. The plurality of columns 11 include a plurality of sets of two columns 11 arranged at an interval in direction D2 at intervals in direction D1.

The size of the storage shelf 1 is, for example, 20 m in length in direction D1, 2.1 m in length in direction D2, and 10 m in length in direction D3. The size of the storage shelf 1 can be appropriately set according to the size of cultivation room 101 and the number of cultivation units 2 to be loaded.

The storage shelf 1 further includes a power transmitter 12 that supplies power to an irradiation device 22 included in the cultivation unit 2. The power transmitter 12 is electrically connected to a power supply such as a commercial power supply to obtain power. In the present embodiment, the power transmitter 12 supplies power to the irradiation device 22 by wireless power transfer.

As illustrated in FIG. 4, the storage shelf 1 includes a plurality of storage areas A2 arranged in each of direction D1 and direction D3. One cultivation unit 2 is stored in each of the plurality of storage areas A2.

The storage areas A2 adjacent in direction D3, that is, the vertical direction, are separated by the shelf members 10. Two storage areas A2 adjacent to each other in direction D1 are separated by two columns 11 arranged in direction D2.

1.2.3 Cultivation Unit

Each of the plurality of cultivation units 2 is a multistage shelf on which the plurality of cultivation tanks 3 can be placed. The plurality of cultivation units 2 have the same structure. The cultivation unit 2 can be taken in and out of the storage shelf 1.

As illustrated in FIG. 1, the cultivation unit 2 includes a plurality of support plates 20 arranged at intervals in direction D3, and a plurality of columns 21 that support the plurality of support plates 20. The plurality of support plates 20 and the plurality of columns 21 are both made of metal, for example.

The size of the cultivation unit 2 is, for example, 1.8 m in length in direction D2, 1.5 m in length in direction D1, and 2.0 m in length in direction D3, that is, in the vertical direction. In this case, various works can be easily performed on each of the cultivation tanks 3 on the cultivation unit 2 in a state where the cultivation unit 2 is disposed in the work station A1.

In the present embodiment, the cultivation unit 2 includes five support plates 20 and four columns 21. Each of the five support plates 20 has a rectangular shape in plan view, and its four corners are supported by four columns 21. The number of support plates 20 included in the cultivation unit 2 can be set as appropriate. In the present embodiment, each of the plurality of support plates 20 has a flat rectangular box shape opened downward.

The cultivation unit 2 further includes a plurality of irradiation devices 22 that irradiate each of the plurality of cultivation tanks 3 with grow light. In the present embodiment, each of the plurality of irradiation devices 22 is attached to a lower surface of a corresponding one of the plurality of support plates 20 except for the lowermost support plate 20. Each of the plurality of irradiation devices 22 is a light emitting diode (LED) lamp 220. The LED lamp 220 is accommodated within the thickness of the box-shaped support plate 20.

The cultivation unit 2 further includes a power receiver 23 to which power is supplied from the power transmitter 12 of the storage shelf 1 by wireless power transfer. The power receiver 23 is provided on the lowermost support plate 20. The LED lamp 220 is electrically connected to the power receiver 23 through electric wiring (not illustrated).

In the cultivation unit 2, the cultivation tank 3 is disposed on each of the plurality of support plates 20 except for the uppermost support plate 20. As illustrated in FIG. 4, in the present embodiment, two cultivation tanks 3 are disposed so as to be adjacent to each other in direction D1 on each support plate 20. For this reason, a total of eight cultivation tanks 3 are installed in one cultivation unit 2. Each support plate 20 is provided with positioning means (not illustrated) that fixes the position of each of the two cultivation tanks 3.

1.2.4 Cultivation Tank

As illustrated in FIG. 1, each of the plurality of cultivation tanks 3 is a cultivation container that holds plants P1 and the cultivation liquid L1 for growing the plants P1. The plurality of cultivation tanks 3 have the same structure.

The cultivation tank 3 includes a flat box-shaped tray 30 opened upward, and a planting panel 31 attached to an upper part of the tray 30. The cultivation liquid L1 is held in the tray 30. Each of the tray 30 and the planting panel 31 has a substantially rectangular shape in plan view. Each of the tray 30 and the planting panel 31 is a resin molded article, and is formed by vacuum molding, for example.

The size of the cultivation tank 3 is, for example, 1300 mm in length in direction D2, 700 mm in length in direction D1, and 70 mm in length in direction D3. The cultivation tank 3 is provided in a portable size. In the present embodiment, 15 liters of the cultivation liquid L1 can be stored in the tray 30.

The planting panel 31 is provided with a plurality of openings 310 for holding the plants P1. The plurality of openings 310 are arranged at intervals on the entire planting panel 31. The number and intervals of the plurality of openings 310 provided in the planting panel 31 are appropriately set according to the growth stage and the type of the plant P1 to be held.

The planting panel 31 and the tray 30 are provided with a locking structure that locks the parts onto each other. This makes it possible to curb displacement of the planting panel 31 with respect to the tray 30 during conveyance of the cultivation unit 2.

Each of a plurality of types of planting panels 31 can be attached to the tray 30. The plurality of types of planting panels 31 include, for example, a first planting panel 31 used from the initial stage of cultivation to the middle stage of cultivation, and a second planting panel 31 used from the middle stage of cultivation to the harvest period. The first planting panel 31 has a larger number of openings 310 than the second planting panel 31, and the interval between adjacent openings 310 is narrower. By attaching the planting panel 31 corresponding to the growth stage of the plant P1 to the tray 30, the plant P1 can be cultivated efficiently in the cultivation tank 3.

The planting panel 31 is provided with a through hole 311 used for discharging the cultivation liquid L1 in the tray 30 and supplying the cultivation liquid L1 into the tray 30. The through hole 311 penetrates the planting panel 31 in direction D3, that is, in the vertical direction. The through hole 311 is provided at an end on one side in direction D2 of the planting panel 31, specifically, at an end on the side of the conveyance passage between the pair of storage shelves 1. The through hole 311 is formed at a fixed position regardless of the type of the planting panel 31.

1.2.5 Conveyance Device

The conveyance device 4 is a device that conveys each of the plurality of cultivation units 2 one by one between the storage shelf 1 and the work station A1. The conveyance device 4 can move the cultivation unit 2 in the horizontal direction and in the vertical direction. The conveyance device 4 includes a horizontally moving part 40 that is movable in the horizontal direction, and a lift 41 that is integrated with the horizontally moving part 40 and is movable in the vertical direction. The conveyance device 4 of the present embodiment conveys the discharge device 50 and the supply device 51 in addition to conveying the cultivation unit 2.

In the present embodiment, the conveyance device 4 is configured by a stacker crane 42 and a plurality of conveyor devices 43. The stacker crane 42 is installed in the cultivation room 101, and the conveyor device 43 is installed in each of the cultivation room 101 and the work room 102. A conveyor device 43a installed in the cultivation room 101 and a conveyor device 43b installed in the work room 102 are separate devices, and do not hinder opening and closing of the entrance 104 by the automatic door 105.

Figure 5:
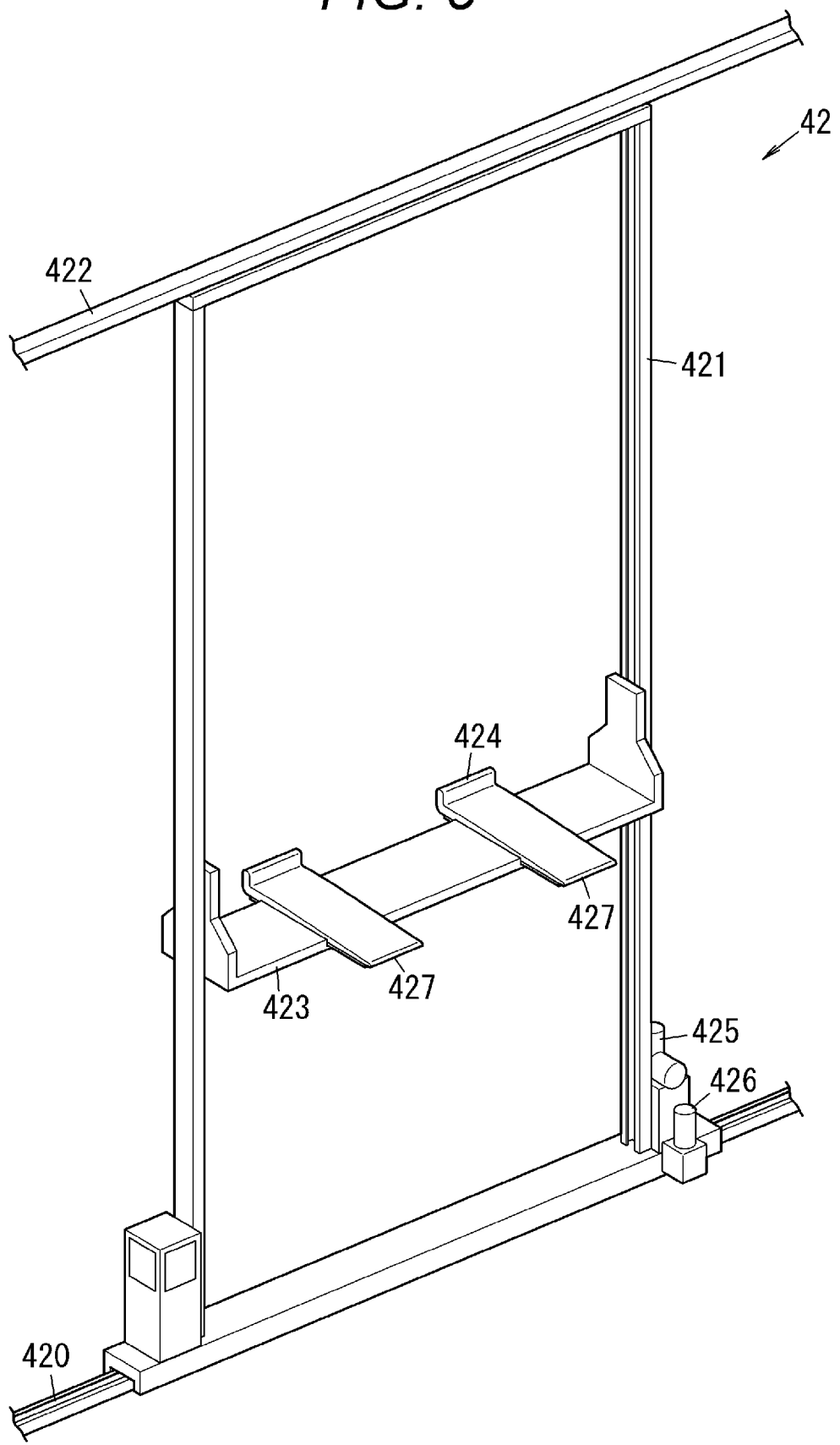
FIG. 5 is a perspective view schematically illustrating a conveyance device included in the cultivation equipment.

As illustrated in FIGS. 2 and 5, the stacker crane 42 includes a traveling rail 420 installed on a floor surface of the cultivation room 101, a frame 421 which is movable on the traveling rail 420 and has a rectangular frame shape as viewed in direction D2, and a guide rail 422 installed above the traveling rail 420 so as to guide the movement of the frame 421. The stacker crane 42 further includes a cargo bed 423 installed in the frame 421 in a vertically movable manner, a fork device 424 provided on the cargo bed 423, a lift device 425 that moves the cargo bed 423 vertically, and a traveling device 426 that moves the frame 421 along the traveling rail 420 and the guide rail 422.

The stacker crane 42 moves the cargo bed 423 to a position adjacent to the target cultivation unit 2 stored in the storage shelf 1, and then inserts claws 427 of the fork device 424 under the target cultivation unit 2 to lift the target cultivation unit 2. As a result, the stacker crane 42 can move the cultivation unit 2 from the storage shelf 1 to the cargo bed 423. Additionally, after the stacker crane 42 moves the cargo bed 423 on which the target cultivation unit 2 is placed to a position adjacent to the conveyor device 43a in the cultivation room 101, the stacker crane 42 can place the target cultivation unit 2 can be placed on the conveyor device 43a using the fork device 424.

The conveyor device 43a moves the cultivation unit 2 in the horizontal direction in the cultivation room 101, that is, in directions D1 and D2. The cultivation unit 2 is transferred between the conveyor device 43a and the conveyor device 43b, thereby moving between the cultivation room 101 and the work room 102.

In the present embodiment, the frame 421 of the stacker crane 42 and the conveyor devices 43a, 43b form the horizontally moving part 40, and the cargo bed 423 forms the lift 41. The cargo bed 423 forming the lift 41 is provided integrally with the frame 421 of the horizontally moving part 40, and moves horizontally along with the horizontal movement of the frame 421.

1.2.6 Discharge/Supply Device, or Discharge Device and Supply Device

FIG. 1 illustrates one discharge/supply device 5 forming the discharge device 50 and the supply device 51 of the present embodiment. The discharge/supply device 5 is a device that is movable among the plurality of cultivation tanks 3 and performs both supplying and discharging of the cultivation liquid L1 to and from the plurality of cultivation tanks 3. In the present embodiment, the discharge/supply device 5 is conveyed by the conveyance device 4.

The discharge/supply device 5 includes a nozzle 52 that discharges and supplies the cultivation liquid L1, a connector 53 that connects the nozzle 52 to a connection target, that is, to the cultivation tank 3 in the present embodiment, a tank 54 that stores the cultivation liquid L1, and a hose 55 that connects the tank 54 and the nozzle 52. The discharge/supply device 5 further includes a pump 56 for discharging and supplying the cultivation liquid L1, an imaging device 57 for imaging the cultivation tank 3, and a controller. The controller is a device that controls the connector 53, the pump 56, and the imaging device 57. All of the configurations of the discharge/supply device 5, that is, the nozzle 52, the connector 53, the tank 54, the hose 55, the pump 56, the imaging device 57, and the controller are installed in the lift 41 of the conveyance device 4, that is, the cargo bed 423.

The nozzle 52 includes a discharge nozzle for sucking the cultivation liquid L1 in the cultivation tank 3, specifically, a waste liquid L10 in which the contained nutrients are reduced, and a supply nozzle for ejecting the cultivation liquid L1, specifically, a nourishing liquid L11 containing nutrients into the cultivation tank 3. The nozzle 52 may be configured by one nozzle and be switchable between suction and ejection.

In the present embodiment, the connector 53 is an articulated robot arm that supports the nozzle 52 and freely moves the nozzle 52 in the horizontal direction, that is, in direction D1 and direction D2, and in the vertical direction, that is, in direction D3. The robot arm can also rotate about an axis parallel to the vertical direction, that is, direction D3, and can connect the nozzle 52 to each of the cultivation tanks 3 of the cultivation units 2 in the pair of storage shelves 1 positioned across the passage from each other.

The connector 53 can move the nozzle 52 between an insertion position and a standby position. The insertion position is a position where the nozzle 52 is inserted into the through hole 311 of the planting panel 31 of the cultivation tank 3. The standby position is a position where the nozzle 52 is separated from the through hole 311. The connector 53 is installed on the tank 54.

The tank 54 includes a tank body 540 that stores the cultivation liquid L1, four columns 545 that support the tank body 540, a bottom plate 546 that is separated from and below the tank body 540 and supported by lower ends of the four columns 545, and a plurality of legs 541 protruding downward from lower surfaces of the four columns 545.

The tank body 540 includes a waste liquid reservoir 542 that stores the cultivation liquid L1 sucked from the inside of cultivation tank 3, that is, the waste liquid L10, a nourishing liquid reservoir 543 that stores a new cultivation liquid L1 to be supplied to the cultivation tank 3, that is, the nourishing liquid L11, and a partition wall 544. The partition wall 544 separates the waste liquid reservoir 542 and the nourishing liquid reservoir 543. Half of the internal space of the tank body 540 is the waste liquid reservoir 542, and the remaining half of the tank body 540 is the nourishing liquid reservoir 543. While the storages 542, 543 are positioned side by side in direction D2 in the present embodiment, the storages 542, 543 may be positioned side by side in direction D1 or direction D3.

The components of the cultivation liquid L1 stored in the nourishing liquid reservoir 543, that is, the nourishing liquid L11 are appropriately set in accordance with the growth stage of the plant P1 or the type of the plant P1. The cultivation liquid L1, that is, the nourishing liquid L11 contains dissolved oxygen. A circulation pump (not illustrated) is installed in the nourishing liquid reservoir 543, and the cultivation liquid L1, that is, the nourishing liquid L11 is maintained in the state containing dissolved oxygen.

The capacity of the tank 54 is 1200 liters, for example. In this case, the waste liquid reservoir 542 can store, for example, 600 liters of the cultivation liquid L1, that is, the waste liquid L10, and the nourishing liquid reservoir 543 can store, for example, 600 liters of a new cultivation liquid L1, that is, the nourishing liquid L11. In this case, the tank 54 enables replacement of all cultivation liquids L1 in a plurality of cultivation tanks 3 of five cultivation units 2.

The shape of the bottom of the tank 54 is the same as the shape of the bottom of the cultivation unit 2. Hence, the claws 427 of the fork device 424 of the stacker crane 42 can be inserted between the plurality of legs 541 below the bottom plate 546 of the tank 54. As a result, the tank 54 can be moved between the cargo bed 423 and the conveyor device 43a using the fork device 424.

The hose 55 includes a discharge hose 550 that connects the discharge nozzle of the nozzle 52 and the waste liquid reservoir 542 of the tank 54, and a supply hose 551 that connects the supply nozzle of the nozzle 52 and the nourishing liquid reservoir 543 of the tank 54. The downstream end of the discharge hose 550 is connected to an upper part of the waste liquid reservoir 542, and the upstream end of the supply hose 551 is connected to a bottom part of the nourishing liquid reservoir 543.

The pump 56 includes a discharge pump 560 connected to the discharge hose 550 and a supply pump 561 connected to the supply hose 551. In the present embodiment, the discharge pump 560 is a vacuum pump, for example. The discharge pump 560 may be provided integrally with the discharge nozzle. In the present embodiment, the supply pump 561 is installed on the bottom plate 546 and is connected to the upstream end of the supply hose 551.

By driving the discharge pump 560, the cultivation liquid L1 in the cultivation tank 3, that is, the waste liquid L10 can be sucked by the discharge nozzle and be sent to the waste liquid reservoir 542 of the tank 54. Additionally, by driving the supply pump 561, the cultivation liquid L1 in the nourishing liquid reservoir 543, that is, the nourishing liquid L11 can be ejected from the supply nozzle and be supplied to the cultivation tank 3.

The imaging device 57 is a device that images the cultivation tank 3, and is a camera, for example. The imaging device 57 is installed in the lift 41 of the conveyance device 4, and thus can move in the vertical direction and in the horizontal direction. In the present embodiment, the imaging device 57 is installed on the connector 53.

The imaging device 57 images the plant P1 held in the cultivation tank 3 as a still image or a moving image, and transmits the imaging data to a display device such as a monitor installed in the work station A1. As a result, in the work station A1, it is possible to remotely check the growth state of the plant P1 in each cultivation tank 3.

The controller includes, for example, a computer including a processor such as a central processing unit (CPU) and a memory. The computer includes a microcomputer. The controller controls each of the connector 53, the pump 56, and the imaging device 57 by executing an appropriate program stored in the memory.

The discharge/supply device 5 of the present embodiment further includes a sensor that detects the position of the through hole 311 of the planting panel 31 of each of the cultivation tanks 3. As the sensor, a known sensor can be used. The controller controls the connector 53 on the basis of the detection result of the sensor to adjust the position of the nozzle 52.

1.2.7 Others

Figure 6:
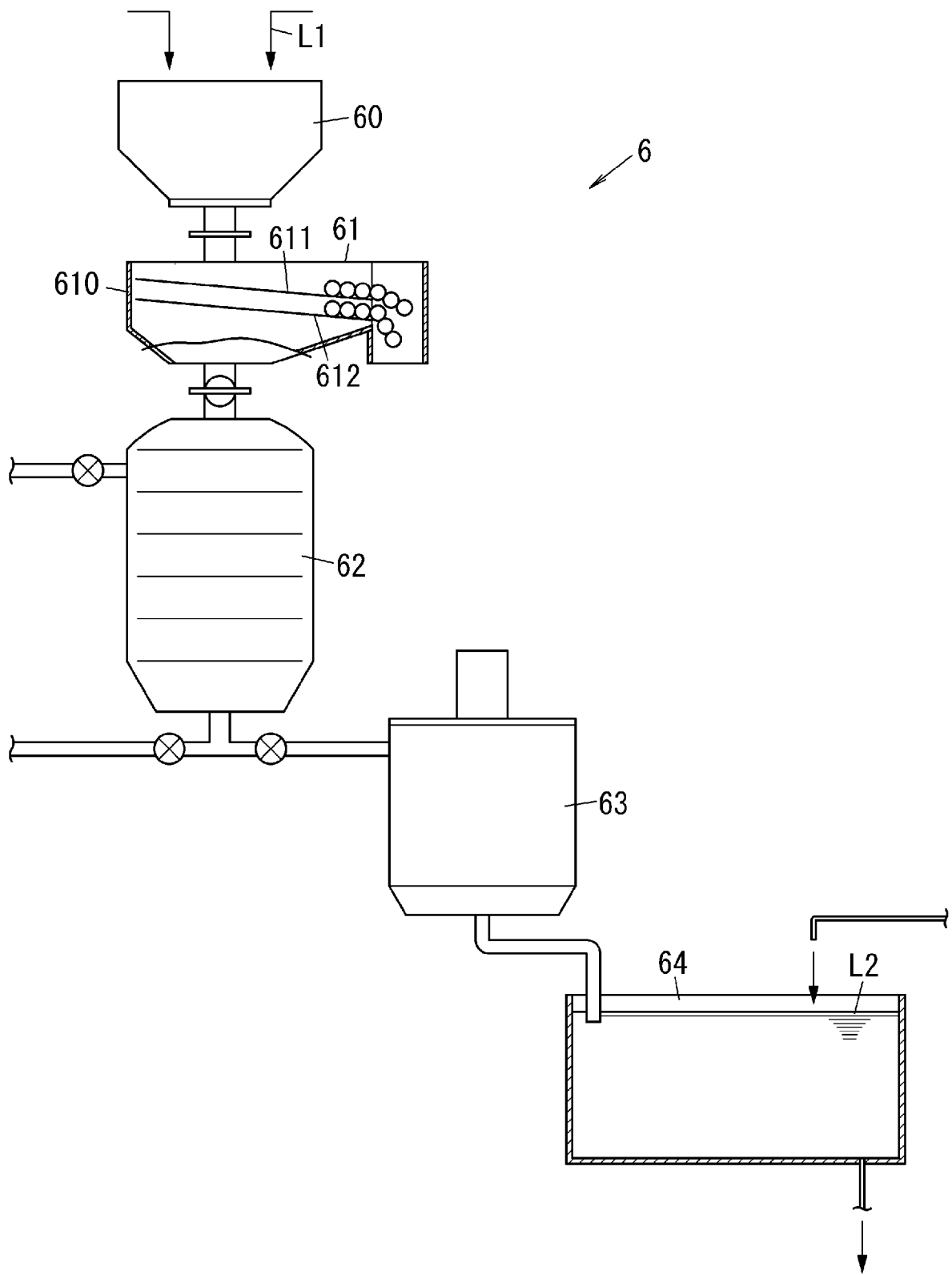
FIG. 6 is a front view schematically illustrating a treatment apparatus included in the cultivation equipment.

The cultivation equipment of the present embodiment further includes a treatment apparatus 6 illustrated in FIG. 6. The treatment apparatus 6 is an apparatus that treats the cultivation liquid L1 discharged from the tank 54 of the discharge/supply device 5, that is, the waste liquid L10.

The treatment apparatus 6 includes a receiving member 60 that receives the cultivation liquid L1 discharged from the tank 54, that is, the waste liquid L10, a contaminant separator 61 that removes contaminants in the cultivation liquid L1, that is, the waste liquid L10, and a filter 62 that filters the cultivation liquid L1, that is, the waste liquid L10. The treatment apparatus 6 further includes a sterilizer 63 that sterilizes the filtered cultivation liquid L1, that is, the waste liquid L10 to obtain a treated liquid L2, and a treated liquid tank 64 that stores the treated liquid L2.

The receiving member 60 is a hopper including a vertically inverted pyramid-shaped container, for example. For example, by driving the pump 56 of the discharge/supply device 5 to eject the cultivation liquid L1 stored in the waste liquid reservoir 542 of the tank 54, that is, the waste liquid L10 from the nozzle 52 to the receiving member 60, the cultivation liquid L1, that is, the waste liquid L10 is supplied to the receiving member 60. The method for discharging the cultivation liquid L1, that is, the waste liquid L10 from the waste liquid reservoir 542 of the tank 54 to the receiving member 60 is not limited to the method using a pump.

The contaminant separator 61 is positioned on the downstream side of the receiving member 60, that is, on the lower side in the present embodiment. The contaminant separator 61 is a device that receives the cultivation liquid L1 that has passed through the receiving member 60 and removes contaminants such as roots and leaves of the plant P1 in the cultivation liquid L1. The contaminant separator 61 includes a container 610 for receiving the cultivation liquid L1 and meshes 611, 612 detachably installed in the container 610. The mesh 612 positioned on the lower side is finer than the mesh 611 positioned on the upper side.

The filter 62 is positioned downstream of the contaminant separator 61, that is, on the lower side in the present embodiment. The filter 62 receives the cultivation liquid L1 that has passed through the contaminant separator 61, and filters the cultivation liquid L1. As a result, the filter 62 can remove fine contaminants remaining in the cultivation liquid L1.

The sterilizer 63 is positioned downstream of the filter 62. The sterilizer 63 sterilizes the cultivation liquid L1 that has passed through the filter 62 to obtain a treated liquid L2. The sterilizer 63 sterilizes the cultivation liquid L1 using nanobubbles, for example.

The treated liquid tank 64 is positioned downstream of the sterilizer 63 and stores the treated liquid L2. The treated liquid L2 stored in the treated liquid tank 64 can be reused as the cultivation liquid L1, that is, the nourishing liquid L11 by adding nutrients and oxygen to the treated liquid L2.

The treatment apparatus 6 is installed in the work room 102 of the cultivation building 100. For example, the treatment apparatus 6 is installed so as to extend over the work room 102 on each floor. For example, the cultivation liquid L1 is naturally dropped using the weight of the cultivation liquid L1 to be moved from the receiving member 60 to the treated liquid tank 64. In this case, since the treatment apparatus 6 does not require a pump, the manufacturing cost can be suppressed.

In the cultivation equipment of the present embodiment, the discharge/supply device 5 sucks the cultivation liquid L1 in the cultivation tank 3, and every time the waste liquid reservoir 542 of the tank 54 is filled with the cultivation liquid L1, that is, the waste liquid L10, the discharge/supply device 5 is conveyed to the work room 102, and the treatment apparatus 6 treats the cultivation liquid L1, that is, the waste liquid L10. As a result, in the cultivation equipment of the present embodiment, a large treatment apparatus provided in a conventional plant factory becomes unnecessary.

1.2.8 Cultivation Method

Next, a cultivation method for cultivating the plant P1 using the above-described cultivation equipment will be described.

The cultivation method includes carry-in step S1, cultivation step S2, pre-carry-out discharge step S3, carry-out step S4, and work step S5.

Carry-in step S1 is a step of storing the plurality of cultivation units 2 in which the plurality of cultivation tanks 3 holding the plants P1 and the cultivation liquid L1 are installed in the storage shelf 1 using the conveyance device 4. At this time, a plurality of cultivation tanks 3 not containing the cultivation liquid L1, that is, the nourishing liquid L11 are installed on each support plate 20 of the cultivation unit 2. In carry-in step S1, the cultivation liquid L1 is not contained in the plurality of cultivation tanks 3 of the cultivation unit 2. Accordingly, the cultivation liquid L1 does not spill from each of the cultivation tanks 3 at the time of conveyance, so that the conveyance speed can be increased and conveyance efficiency can be enhanced.

Cultivation step S2 is a step of cultivating plants P1 in the plurality of cultivation tanks 3 of the plurality of cultivation units 2 stored in the storage shelf 1. Cultivation step S2 includes supply step S20 of supplying the cultivation liquid L1, that is, the nourishing liquid L11 to the plurality of cultivation tanks 3 of the plurality of cultivation units 2, and discharge step S21 of discharging the cultivation liquid L1, that is, the waste liquid L10 from the plurality of cultivation tanks 3 of the plurality of cultivation units 2.

In supply step S20, the stacker crane 42 of the conveyance device 4 moves the discharge/supply device 5 to the vicinity of the target cultivation unit 2. Next, the connector 53 of the discharge/supply device 5 moves the nozzle 52 to insert the tip end of the nozzle 52 into the through hole 311 of the planting panel 31 of the cultivation tank 3 of the target cultivation unit 2. Next, the pump 56 of the discharge/supply device 5, specifically, the supply pump 561 is driven to eject the cultivation liquid L1 in the nourishing liquid reservoir 543, that is, the nourishing liquid L11 from the nozzle 52, and store a predetermined amount of the cultivation liquid L1, that is, the nourishing liquid L11 in the tray 30 of the cultivation tank 3 of the target cultivation unit 2. In supply step S20, the cultivation liquid L1 is supplied to all of the plurality of cultivation tanks 3 of the target cultivation unit 2 in the above-described manner.

Discharge step S21 is a step of discharging the cultivation liquid L1, that is, the waste liquid L10 in which the contained nutrients are reduced, from the cultivation tank 3 of the target cultivation unit 2. In discharge step S21, as in supply step S20, the tip end of the nozzle 52 is inserted into the through hole 311 of the planting panel 31 of the cultivation tank 3 of the target cultivation unit 2. Next, the pump 56 of the discharge/supply device 5, specifically, the discharge pump 560 is driven to suck the cultivation liquid L1 in the tray 30, that is, the waste liquid L10 through the nozzle 52 and send the waste liquid L10 to the waste liquid reservoir 542 of the tank 54. In discharge step S21, the cultivation liquid L1, that is, the waste liquid L10 is discharged from all of the plurality of cultivation tanks 3 of the target cultivation unit 2 in the above-described manner.

In cultivation step S2, after supply step S20 is performed once, a set of discharge step S21 and supply step S20 is repeatedly performed according to the growth rate of the plant P1. This set is performed for the target cultivation unit 2 every other week, for example.

In cultivation step S2, when the waste liquid reservoir 542 of the tank 54 of the discharge/supply device 5 is filled with the cultivation liquid L1, that is, the waste liquid L10, or the cultivation liquid L1 in the nourishing liquid reservoir 543, that is, the nourishing liquid L11 is used up, or both, the discharge/supply device 5 is conveyed from the cultivation room 101 to the work room 102 by the conveyance device 4. In the work room 102, at least one of discharge of the cultivation liquid L1 in the waste liquid reservoir 542 of the tank 54, that is, the waste liquid L10 to the treatment apparatus 6 and supply of the cultivation liquid L1, that is, the nourishing liquid L11 to the nourishing liquid reservoir 543 is performed.

In cultivation step S2, power is supplied from the power transmitter 12 of the storage shelf 1 to the power receiver 23 of each cultivation unit 2. As a result, the LED lamps 220 of the irradiation devices 22 of each cultivation unit 2 irradiate the plurality of plants P1 held by the plurality of cultivation tanks 3 of each cultivation unit 2 with grow light, and the cultivation of the plants P1 is promoted in each cultivation tank 3 in which the cultivation liquid L1 is stored.

In the present embodiment, cultivation step S2 includes checking step S22 of checking the growth state of the plant P1 imaged by the imaging device 57. In supply step S20 and discharge step S21, the plant P1 held in the cultivation tank 3 of the target cultivation unit 2 is imaged by the imaging device 57. The still image or moving image captured by the imaging device 57 is transmitted to the display device of the work station A1, and can be checked in the work station A1.

Pre-carry-out discharge step S3 is a step of discharging the cultivation liquid L1 from all of the plurality of cultivation tanks 3 installed in the target cultivation unit 2. Pre-carry-out discharge step S3 is performed after supply step S20.

Specifically, in pre-carry-out discharge step S3, the cultivation liquid L1 is discharged from all of the plurality of cultivation tanks 3 of the target cultivation unit 2 by the same method as discharge step S21 described above. The cultivation liquid L1 discharged at this time is not limited to the waste liquid L10 in which the contained nutrients are reduced, and may be the nourishing liquid L11 containing a large amount of nutrients.

Carry-out step S4 is performed after pre-carry-out discharge step S3. Carry-out step S4 is a step of carrying out the target cultivation unit 2 from which the cultivation liquid L1 is discharged from the storage shelf 1 to the work station A1 using the conveyance device 4.

Specifically, in carry-out step S4, the target cultivation unit 2 is removed from the storage shelf 1 by the stacker crane 42 of the conveyance device 4. The target cultivation unit 2 is conveyed to the conveyor device 43*a* in the cultivation room 101 by the stacker crane 42, and is placed on the conveyor device 43*a*. The target cultivation unit 2 is conveyed by the conveyor device 43*a* in the cultivation room 101, and is delivered to the conveyor device 43*b* in the work room 102. At this time, the automatic door 105 of the wall 103 of the cultivation building 100 opens automatically. When the entire target cultivation unit 2 is placed on the conveyor device 43*b* in the work room 102, the automatic door 105 automatically closes the entrance 104.

In carry-out step S4, the cultivation liquid L1 is substantially not contained in the plurality of cultivation tanks 3 of the cultivation unit 2. Accordingly, spillage of the cultivation liquid L1 from each of the cultivation tanks 3 during conveyance of the cultivation tanks 3 can be curbed, so that the conveyance speed can be increased and conveyance efficiency can be enhanced. Additionally, in carry-out step S4, the cultivation liquid L1 that has adhered to a root part of the plant P1 held by the planting panel 31 of each of the cultivation tanks 3 can be dropped onto the tray 30 by vibration during conveyance.

Work step S5 is a step of performing various works on the plurality of cultivation tanks 3 of the target cultivation unit 2 conveyed to the work station A1.

In work step S5, for example, the plants P1 held in the plurality of cultivation tanks 3 of the target cultivation unit 2 are harvested. At this time, for example, the boundary between a leaf part and a root part of the plant P1 is cut, and only the leaf part is harvested. In the present embodiment, the cultivation liquid L1 is substantially not contained in each of the cultivation tanks 3 at the time of conveyance of the cultivation unit 2. Hence, it is possible to prevent the cultivation liquid L1 from splashing onto the leaf part at the time of conveyance, and to prevent an increase in the amount of water required for cleaning the leaf part of the plant P1.

In the cultivation tank 3 in which the harvest of the leaf part of the plant P1 is completed, the planting panel 31 is removed from the tray 30, the cut root part of the plant P1 and the remaining cultivation liquid L1 are taken out of the tray 30, and the tray 30 and the planting panel 31 are cleaned. As a result, the tray 30 and the planting panel 31 can be reused.

In addition, in work step S5, a work of inspecting the growth degree of the plant P1 held in the plurality of cultivation tanks 3 of the target cultivation unit 2 and a work of replacing the planting panel 31 included in the plurality of cultivation tanks 3 of the target cultivation unit 2 with another planting panel 31 are performed.

1.2.9 Action and Effect

The cultivation equipment of the present embodiment described above includes the discharge/supply device 5, namely, the discharge device 50 and the supply device 51 in the present embodiment, that is movable in the cultivation room 101 and can supply and discharge the cultivation liquid L1 to and from the plurality of cultivation tanks 3 of the plurality of cultivation units 2 in the storage shelf 1.

For this reason, in the cultivation equipment of the present embodiment, there is no need to install a large number of pipes or a large pump for supply or discharge of the cultivation liquid L1 in the storage shelf 1, and it is possible to prevent complication and upsizing of the equipment. Accordingly, in the cultivation equipment of the present embodiment, the storage shelf 1 is easily increased in height, and the harvest amount per unit area is easily increased.

Additionally, in the cultivation equipment of the present embodiment, when the cultivation unit 2 is conveyed between the storage shelf 1 and the work station A1 by the conveyance device 4, a plurality of cultivation tanks 3 of the cultivation unit 2 can be kept in a state where the cultivation tanks 3 do not contain or substantially do not contain the cultivation liquid L1.

Hence, in the cultivation equipment of the present embodiment, the weight of the cultivation unit 2 at the time of conveyance can be curbed, and the load applied to the conveyance device 4 can be curbed. Additionally, in the cultivation equipment of the present embodiment, there is no risk of liquid leakage when the cultivation unit 2 is conveyed by the conveyance device 4. Hence, the speed of conveyance of the cultivation unit 2 by the conveyance device 4 can be increased, and the harvest amount per unit time can be improved.

Additionally, in the cultivation equipment of the present embodiment, liquid leakage from each cultivation tank 3 of the cultivation unit 2 at the time of conveyance can be prevented, so that it is possible to curb contamination of each of the storage shelf 1, the cultivation unit 2, the conveyance device 4, and the conveyance passage with the cultivation liquid L1.

Additionally, in the cultivation equipment of the present embodiment, since the discharge/supply device 5 can be moved by the conveyance device 4 that conveys the cultivation unit 2, a separate device for moving the discharge/supply device 5 is not required, and equipment cost can be kept low.

Additionally, in the cultivation equipment of the present embodiment, the discharge device 50 that discharges the cultivation liquid L1 and the supply device 51 that supplies the cultivation liquid L1 are configured by one discharge/supply device 5. Hence, the cultivation liquid L1 can be replaced collectively for the cultivation tanks 3 in the cultivation unit 2, and workability can be improved.

Additionally, in the cultivation equipment of the present embodiment, the number of times of conveyance of the cultivation units 2 can be reduced as compared with a case where the cultivation units 2 are repeatedly conveyed between the storage shelf 1 and the work station A1 for replacement of the cultivation liquid L1.

1.3 Modification

Next, modifications of the cultivation equipment of the present embodiment will be described. The following modifications can be appropriately combined.

The discharge device 50 and the supply device 51 do not need to be configured by one discharge/supply device 5, and may be separate devices. In this case, each of the discharge device 50 and the supply device 51 have a structure common to the discharge/supply device 5. That is, the discharge device 50 includes a part corresponding to the discharge nozzle of the nozzle 52, the connector 53, a part corresponding to the waste liquid reservoir 542 of the tank 54, a part corresponding to the discharge hose 550 of the hose 55, a part corresponding to the discharge pump 560 of the pump 56, the imaging device 57, and the controller. The supply device 51 includes a part corresponding to the supply nozzle of the nozzle 52, the connector 53, a part corresponding to the nourishing liquid reservoir 543 of the tank 54, a part corresponding to the supply hose 551 of the hose 55, a part corresponding to the supply pump 561 of the pump 56, the imaging device 57, and the controller.

The discharge/supply device 5 may be conveyed not by the conveyance device 4 but by a device different from the conveyance device 4. Additionally, in a case where the discharge device 50 and the supply device 51 are provided separately, the discharge device 50 and the supply device 51 may be conveyed by devices different from the conveyance device 4.

Additionally, the conveyance device 4 is not limited to the combination of the stacker crane 42 and the conveyor devices 43a, 43b described above. The conveyance device 4 may include, for example, a suspension-type conveyance device instead of the stacker crane 42. Additionally, the conveyance device 4 does not need to include the conveyor device 43a installed in the cultivation room 101, and the stacker crane 42 may convey the cultivation units 2 between the storage shelf 1 and the conveyor device 43b.

Additionally, the cultivation equipment does not need to include the imaging device 57, and the growth state of the plant P1 may be checked when the cultivation unit 2 is conveyed to the work station A1.

Additionally, the imaging device 57 may be any device as long as the device is installed in the lift 41 and images the plurality of cultivation tanks 3, and the installation position of the imaging device 57 is not limited to the position on the connector 53, and may be other positions.

Figure 7:
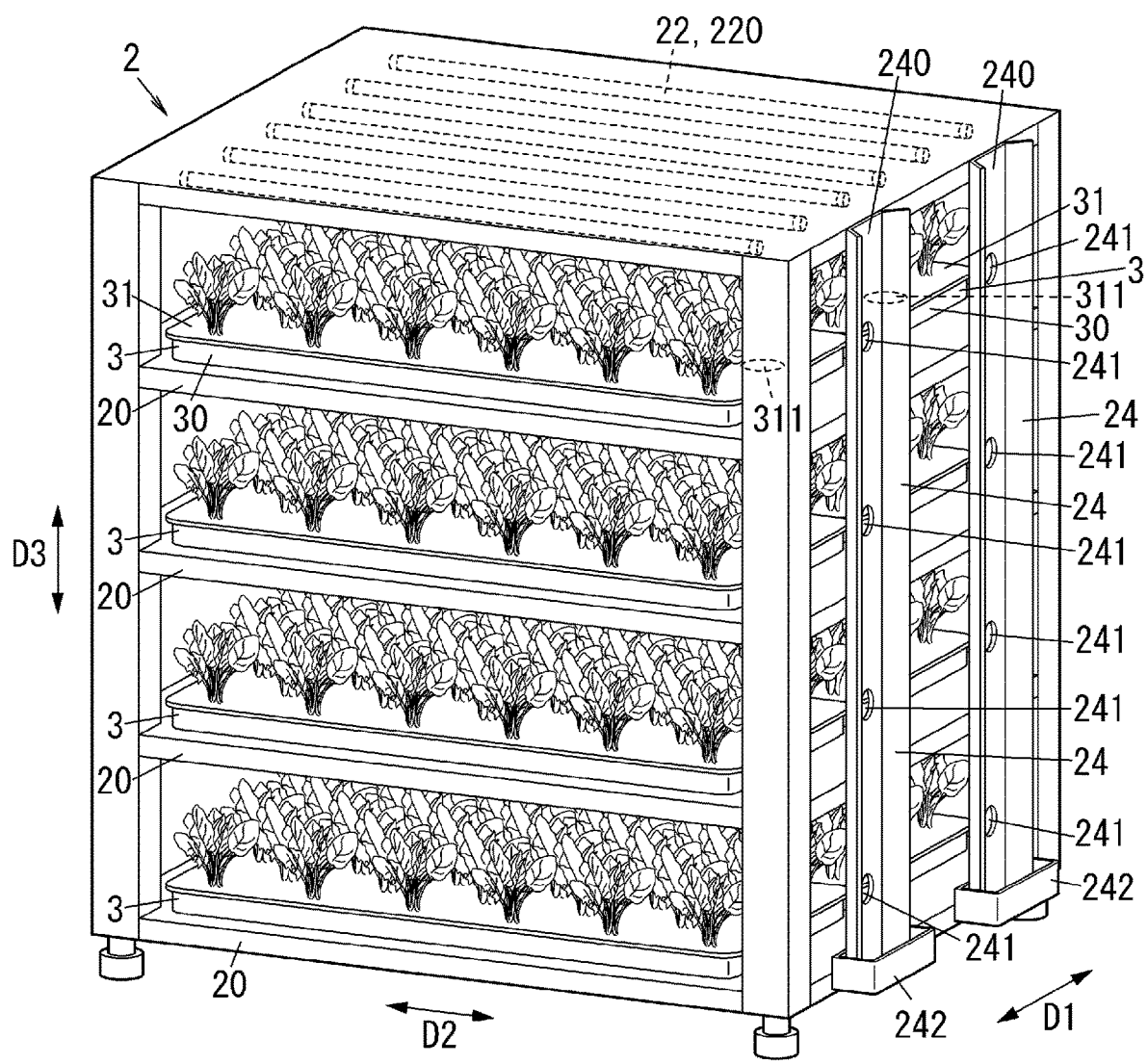
FIG. 7 is a perspective view illustrating Modification 1 of the cultivation unit included in the cultivation equipment.

The cultivation unit 2 is not limited to the structure described above. For example, as in Modification 1 illustrated in FIG. 7, the cultivation unit 2 may further include a guide member 24 that guides insertion of the nozzle 52 into the through hole 311 of the planting panel 31 of each cultivation tank 3. The guide member 24 is fixed to one side in direction D1 of the support plate 20 of each stage, specifically, an end surface on the conveyance passage side. The cultivation unit 2 includes two guide members 24. The two guide members 24 are spaced apart in direction D1. The two guide members 24 are arranged so as to correspond to positions of two cultivation tanks 3 arranged on the support plate 20.

Specifically, the guide member 24 includes a plate-shaped main body 240 extending in direction D3, a plurality of through holes 241 provided in the main body 240, and a water receiving container 242 in which a lower part of the main body 240 is accommodated. Both ends of the main body 240 in direction D1 are inclined with respect to a central part in direction D1, and the gap between the both ends increases toward end edges of the main body 240 in direction D1.

A plurality of through holes 241 are formed at intervals in direction D3 in the central part of the main body 240 in direction D1. The plurality of through holes 241 are arranged so as to have a predetermined positional relationship with respect to the through holes 311 of the planting panels 31 of the cultivation tanks 3 installed on the support plates 20 of the stages of the cultivation unit 2. The water receiving container 242 receives liquid leakage at the time of insertion or removal of the nozzle 52.

For example, when the through hole 241 is detected by a sensor, the controller of the discharge/supply device 5 controls the position of the nozzle 52 such that the nozzle 52, the through hole 241, and the through hole 311 of the planting panel 31 are positioned on a straight line. Next, by moving the nozzle 52 linearly, the controller can insert the nozzle 52 through the through hole 241 of the guide member 24 and the through hole 311 of the planting panel 31, and into the tray 30.

Alternatively, as in Modification 2 illustrated in FIGS. 8A and 8B, the cultivation unit 2 may include: a first unit 25 having a plurality of support plates 20 arranged at intervals in direction D3, that is, in the vertical direction; and a second unit 26 that can be combined with the first unit 25 and has a plurality of irradiation devices 22.

The first unit 25 has substantially the same structure as the cultivation unit 2 of Embodiment 1, and does not include the plurality of irradiation devices 22 and the power receiver 23. That is, the first unit 25 includes a plurality of, to be more specific, five support plates 20 arranged at intervals in direction D3, and a plurality of, to be more specific, four columns 21 supporting the plurality of support plates 20. Each of the plurality of support plates 20 has a flat rectangular box shape opened to the lower side and to the side, that is, to one side in direction D2.

The second unit 26 includes two columns 260 positioned at an interval in direction D1, a plurality of coupling members 261 bridged across the two columns 260 and arranged at intervals in direction D3, and a plurality of support members 262 fixed two by two to each of the plurality of coupling members 261. The two support members 262 of each stage have one ends fixed to the coupling member 261, and are disposed along direction D2 at an interval. The irradiation device 22 is bridged across and supported by the two support members 262 of each stage. The two support members 262 of each stage are configured to support the irradiation device 22 at a height corresponding to each of the plurality of support plates 20 of the first unit 25 except the lowermost support plate 20.

The second unit 26 includes a power cord 263 connected to the plurality of irradiation devices 22. The power cord 263 is mechanically and electrically connected to a power supply device (not illustrated) such as a power supply cord and an outlet provided on the storage shelf 1.

The second unit 26 is fixed to the storage shelf 1 with appropriate fixing means to be installed in a standing state on the shelf member 10. The second unit 26 may be provided on the shelf member 10 of the storage shelf 1 in a self-supporting manner.

In a state where the first unit 25 and the second unit 26 are combined, the irradiation devices 22 of each stage of the second unit 26 are disposed on the support plate 20 of each stage of the first unit 25. When the first unit 25 is carried into the storage shelf 1 by the conveyance device 4, the first unit 25 is conveyed to a position where it is combined with the second unit 26.

The first unit 25 and the second unit 26 can be integrated by connecting the columns 21, 260 with a fixing tool such as a bolt and a nut in a state where the columns 21, 260 are placed to overlap each other in direction D2. By integrating the first unit 25 and the second unit 26 in this manner, the first unit 25 and the second unit 26 can be conveyed together using the conveyance device 4.

In the cultivation unit 2 of Modification 2, it is possible to convey only the first unit 25 of the cultivation unit 2 by the conveyance device 4, and the second unit 26 including the irradiation device 22 can be left in the storage shelf 1. For this reason, in the cultivation unit 2 of Modification 2, a structure for performing wireless power transfer as in the cultivation unit 2 of Embodiment 1 is unnecessary. Hence, it is possible to curb occurrence of trouble at the time of power supply and to curb the manufacturing cost.

Additionally, in the cultivation unit 2 of Modification 2, the plurality of irradiation devices 22 can be collectively installed in the storage shelf 1 only by fixing the second unit 26 in which the plurality of irradiation devices 22 are installed to the storage shelf 1. Thus, it is possible to omit the work of installing the irradiation devices 22 one by one in the storage shelf 1.

Additionally, the discharge/supply device 5 is not limited to the structure described above. For example, the discharge/supply device 5 may include a plurality of nozzles 52, more specifically, the same number of nozzles 52 as the number of the plurality of cultivation tanks 3 installed in one cultivation unit 2, and may simultaneously replace the cultivation liquid L1 in the plurality of cultivation tanks 3 installed in one cultivation unit 2.

Figure 9:
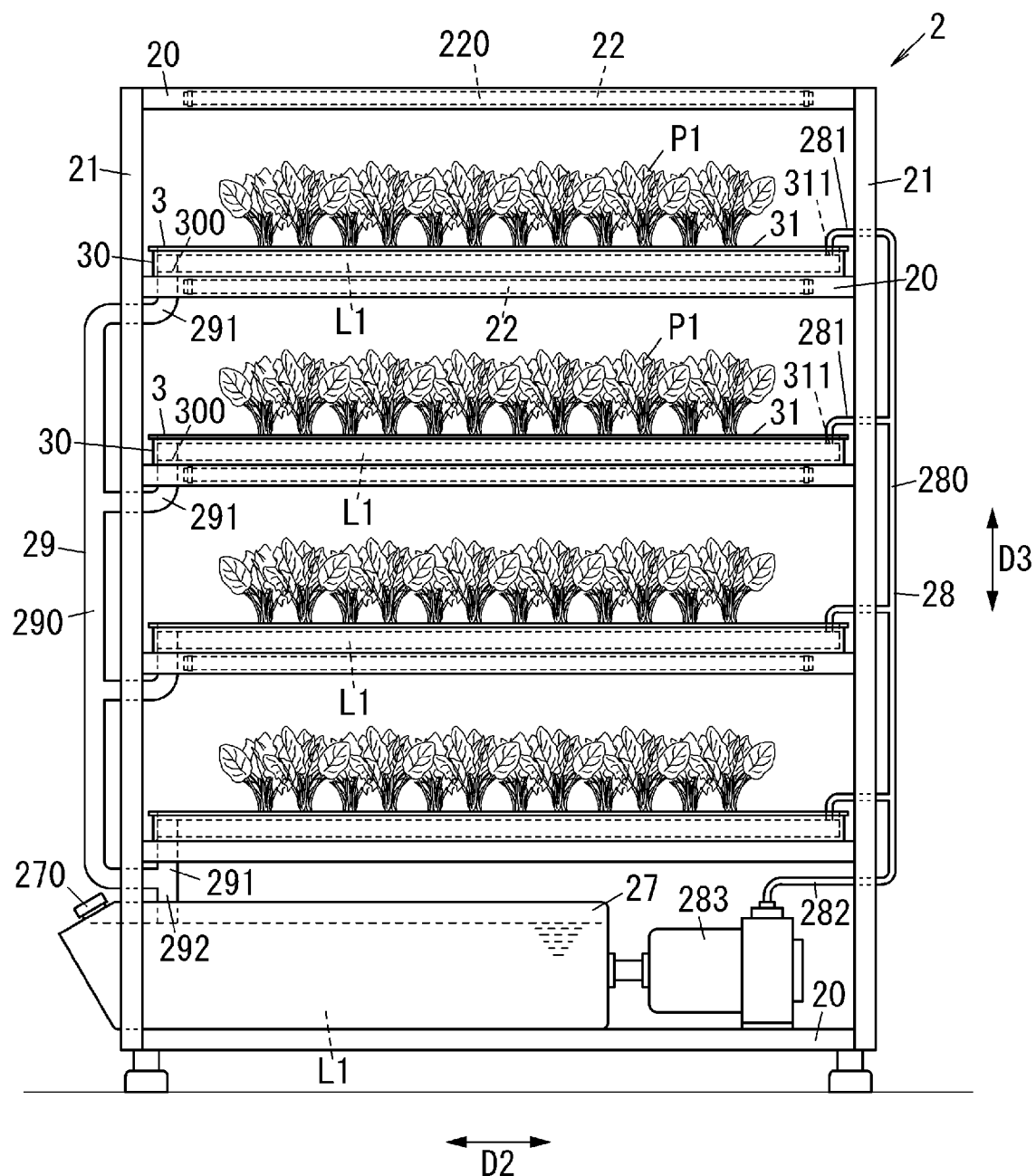
FIG. 9 is a front view illustrating Modification 3 of the cultivation unit included in the cultivation equipment.

Alternatively, as in Modification 3 illustrated in FIG. 9, the cultivation unit 2 may further include a unit tank 27, a supply pipe 28, and a discharge pipe 29 in addition to the configuration of the cultivation unit 2 of Embodiment 1.

The unit tank 27 is a tank for storing the cultivation liquid L1. The supply pipe 28 connects unit tank 27 and the plurality of cultivation tanks 3, and supplies the cultivation liquid L1 in the unit tank 27 to the plurality of cultivation tanks 3. The discharge pipe 29 connects the unit tank 27 and the plurality of cultivation tanks 3, and discharges the cultivation liquid L1 in the plurality of cultivation tanks 3 to the unit tank 27.

In the present embodiment, the connection target of the connector 53 is the unit tank 27. The unit tank 27 is installed on the lowermost support plate 20 of the plurality of support plates 20 of the cultivation unit 2. The unit tank 27 has a discharge/supply port 270. The discharge/supply port 270 connects the internal space of the unit tank 27 where the cultivation liquid L1 is stored and the external space of the unit tank 27. The nozzle 52 of the discharge/supply device 5 is inserted into the discharge/supply port 270.

The supply pipe 28 connects each of the plurality of cultivation tanks 3 and the unit tank 27. The supply pipe 28 includes, for example, a linear main pipe 280, a plurality of L-shaped connection pipes 281 communicating with the main pipe 280, and a coupling pipe 282 communicating with the main pipe 280 and the unit tank 27. A pump 283 is connected to the coupling pipe 282. The pump 283 is installed on the lowermost support plate 20 of the plurality of support plates 20 of the cultivation unit 2. The number of the connection pipes 281 is equal to the number of the plurality of cultivation tanks 3 installed in the cultivation unit 2. Downstream ends of the plurality of connection pipes 281 are inserted one-to-one into the through holes 311 of the planting panels 31 of the plurality of cultivation tanks 3. By driving the pump 283, the cultivation liquid L1 in the unit tank 27 is supplied into the plurality of cultivation tanks 3 through the plurality of connection pipes 281, respectively.

The discharge pipe 29 connects each of the plurality of cultivation tanks 3 and the unit tank 27. In the present embodiment, the discharge pipe 29 is a pipe thicker than the supply pipe 28. The discharge pipe 29 includes, for example, a linear main pipe 290, a plurality of L-shaped connection pipes 291 communicating with the main pipe 290, and a coupling pipe 292 communicating with the lowermost connection pipe 291 and the unit tank 27. The number of the connection pipes 291 is equal to the number of the plurality of cultivation tanks 3 installed in the cultivation unit 2.

Upstream ends of the plurality of connection pipes 291 are connected to discharge ports 300 formed in bottom walls of the trays 30 of the plurality of cultivation tanks 3. The discharge port 300 is positioned at an end of the cultivation tank 3 opposite to the through hole 311. An upstream end, that is, an upper end of each connection pipe 291 is positioned at a predetermined height, such as 50 mm, from a bottom surface of the tray 30 of the corresponding cultivation tank 3. The height is appropriately set according to the type and the like of the plant P1 to be cultivated. The cultivation liquid L1 can be stored in the tray 30 up to the height of the upper end of the connected connection pipe 291. The cultivation liquid L1 that exceeds the height of the upper end of the connection pipe 291 flows into the upper end opening of the connection pipe 291, and is discharged to the unit tank 27. That is, a part of each connection pipe 291 positioned in the tray 30, that is, an upstream end forms an overflow pipe.

Additionally, at least one discharge hole is provided in a lowermost part of the part of each connection pipe 291 positioned in the tray 30. The cultivation liquid L1 in the tray 30 is constantly discharged to the unit tank 27 through the discharge hole.

In the cultivation unit 2 of Modification 3, while the cultivation liquid L1 in the unit tank 27 is supplied to each of the plurality of cultivation tanks 3 through the supply pipe 28, the cultivation liquid L1 in the plurality of cultivation tanks 3 is discharged into the unit tank 27 through the discharge pipe 29. As a result, in the plurality of cultivation tanks 3, a state where the cultivation liquid L1 is stored up to the height of the upper end of the connection pipe 291 connected to each cultivation tank 3 can be maintained.

When the supply of the cultivation liquid L1 through the supply pipe 28 is stopped, all or substantially all of the cultivation liquid L1 in the tray 30 of each of the cultivation tanks 3 is discharged to the unit tank 27 through the discharge hole of the corresponding connection pipe 291, whereby each of the cultivation tanks 3 can be brought into a state where the cultivation tank 3 does not contain or substantially does not contain the cultivation liquid L1.

In the cultivation unit 2 of Modification 3, the nozzle 52 of the discharge/supply device 5 is connected to the discharge/supply port 270 of the unit tank 27. The discharge/supply device 5 discharges the cultivation liquid L1 in the unit tank 27, that is, the waste liquid L10, and supplies a new cultivation liquid L1, that is, the nourishing liquid L11 into the unit tank 27. The replacement, that is, the discharge and supply of the cultivation liquid L1 by the discharge/supply device 5 is performed every period, such as every week, in which it is estimated that the contained nutrients of the cultivation liquid L1 in the unit tank 27 have decreased to a predetermined value or less.

In the cultivation unit 2 of Modification 3 described above, there is no need to connect the nozzle 52 of the discharge/supply device 5 to each of the plurality of cultivation tanks 3. Hence, it is possible to shorten the time required for discharging and supplying the cultivation liquid L1.

Additionally, in the cultivation unit 2 of Modification 3, relatively thin pipes corresponding to the number of the plurality of cultivation tanks 3 installed in one cultivation unit 2 can be used as the supply pipe 28 and the discharge pipe 29, and a pump having a relatively small capacity can be used as the pump 283. For this reason, in the cultivation equipment including the cultivation unit 2 of Modification 3, upsizing of the equipment can be curbed as compared with a case where a thick pipe or a large-capacity pump is provided in the storage shelf 1 as in the conventional example.

Additionally, since the cultivation unit 2 of Modification 3 can be conveyed between the storage shelf 1 and the work station A1 by the conveyance device 4, maintenance of the unit tank 27, the supply pipe 28, the discharge pipe 29, the pump 283, and the like can be performed easily.

Additionally, in the cultivation unit 2 of Modification 3, when the cultivation unit 2 is conveyed by the conveyance device 4, the plurality of cultivation tanks 3 and the unit tank 27 can be brought into a state where the cultivation tanks 3 and the unit tank 27 do not contain or substantially do not contain the cultivation liquid L1.

Thus, liquid leakage at the time of conveyance can be curbed.

2. Embodiment 2

Next, cultivation equipment of Embodiment 2 illustrated in FIGS. 10 to 14 will be described.

Hereinafter, regarding the cultivation equipment of Embodiment 2, configurations common to the cultivation equipment of Embodiment 1 will be denoted by the same reference numerals in the drawings and detailed description thereof will be omitted, and configurations different from the cultivation equipment of Embodiment 1 will be described in detail.

2.1 Details

Figure 10:
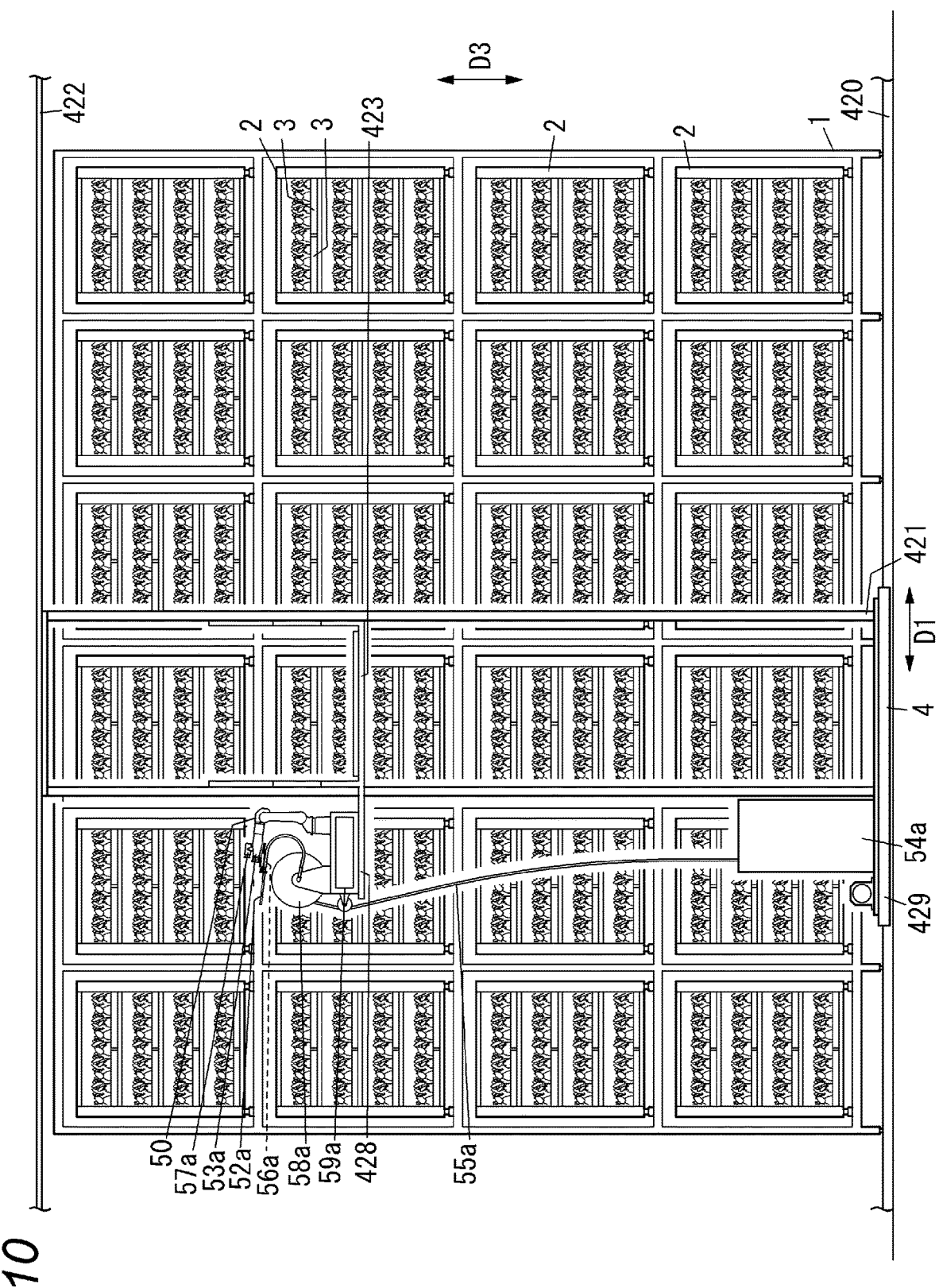
FIG. 10 is a side view schematically illustrating cultivation equipment of Embodiment 2 according to the present disclosure.
Figure 11:
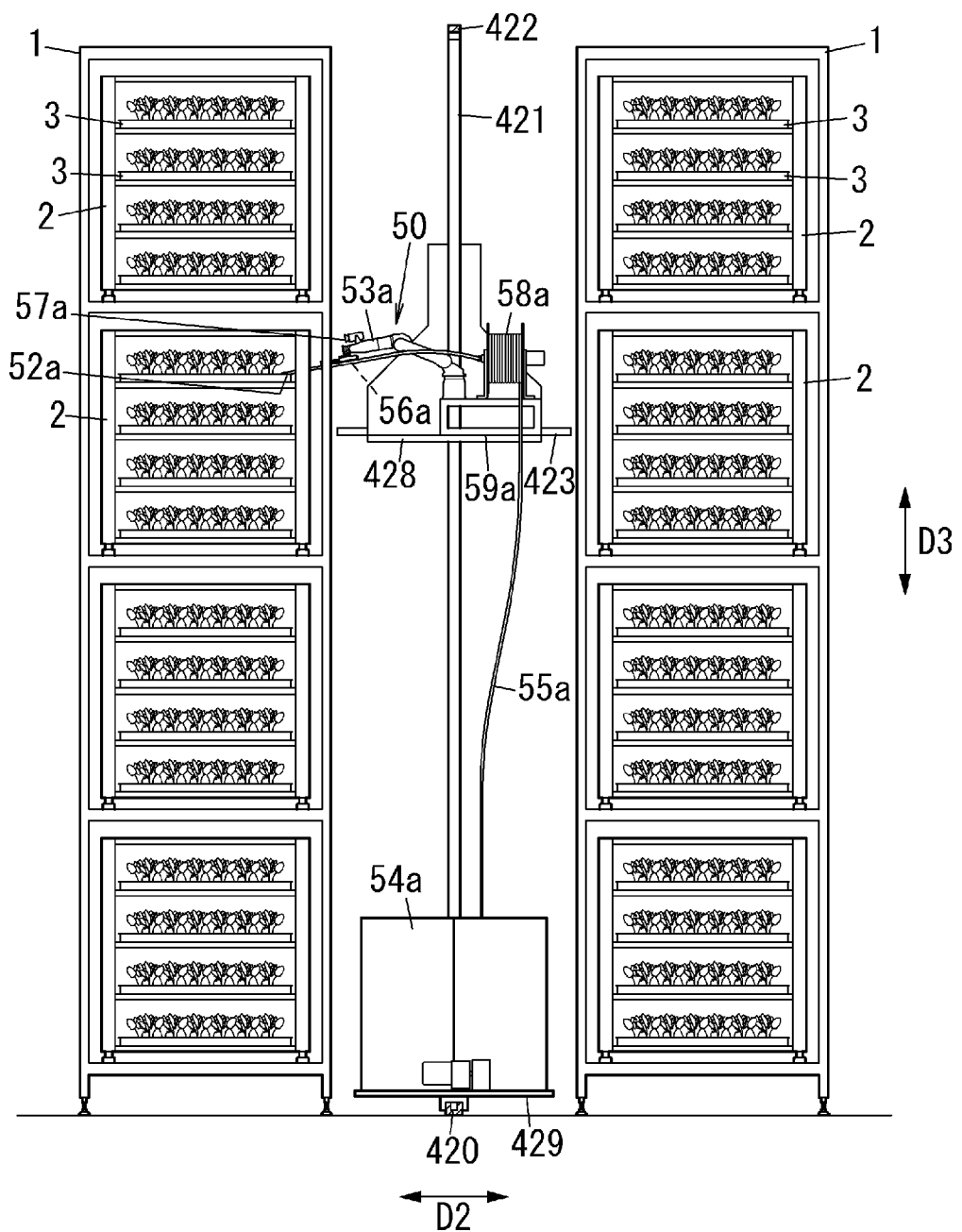
FIG. 11 is a front view schematically illustrating the cultivation equipment.
Figure 12:
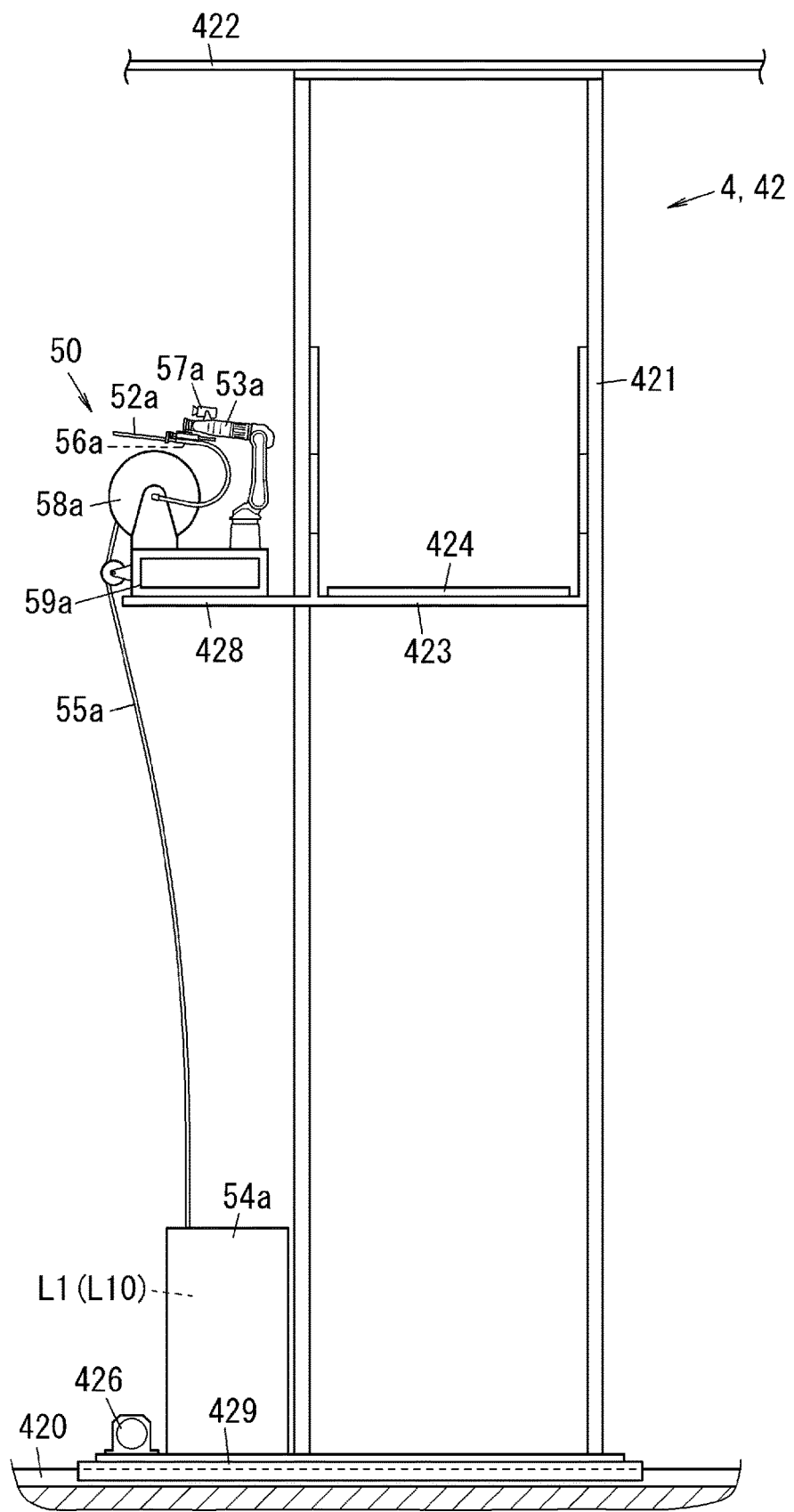
FIG. 12 is a side view illustrating a discharge device and a conveyance device included in the cultivation equipment.
Figure 13:
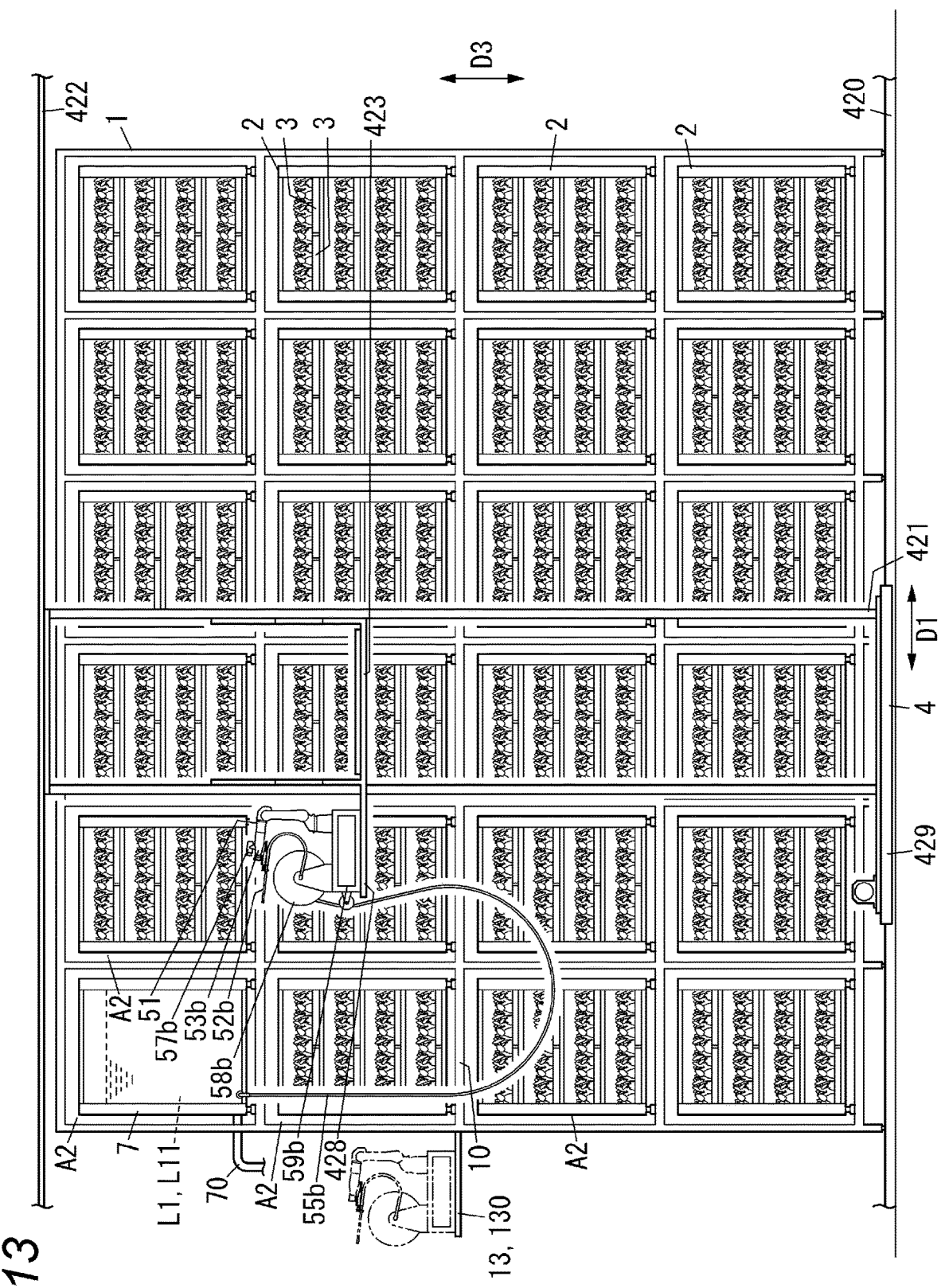
FIG. 13 is another side view schematically illustrating the cultivation equipment.
Figure 14:
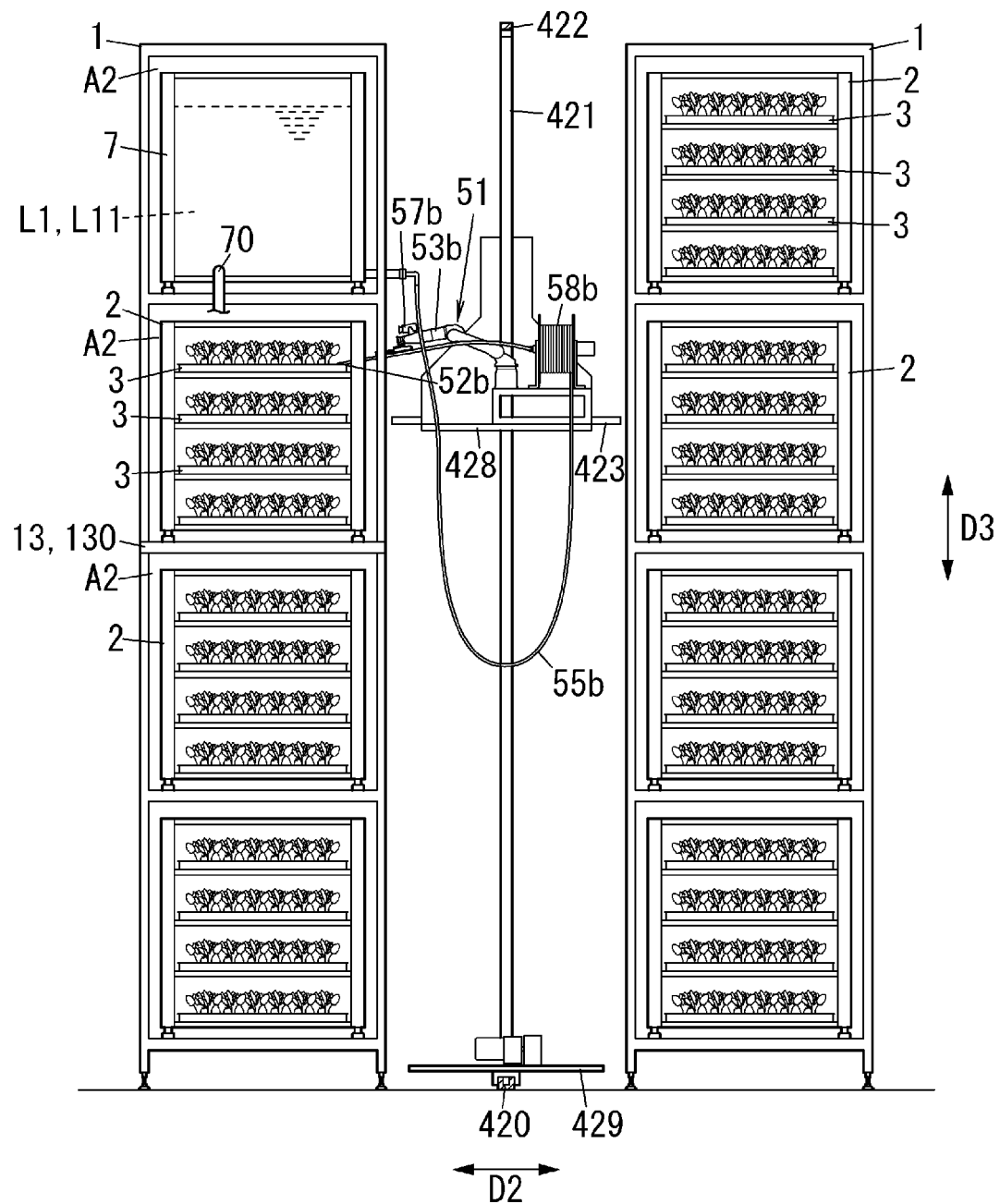
FIG. 14 is another front view schematically illustrating the cultivation equipment.

The cultivation equipment of Embodiment 2 includes a discharge device 50 illustrated in FIGS. 10 to 12 and a supply device 51 illustrated in FIGS. 13 and 14. The discharge device 50 and the supply device 51 are not configured by one discharge/supply device 5, but are separate devices.

As illustrated in FIG. 12, a part of the structure of the discharge device 50 is the same as the structure of the discharge/supply device 5 of Embodiment 1. The discharge device 50 includes a nozzle 52a that discharges a cultivation liquid L1, more specifically, a waste liquid L10, a connector 53a that connects the nozzle 52a to a connection target, a tank 54a that stores the cultivation liquid L1, and a hose 55a that connects the tank 54a and the nozzle 52a. The discharge device 50 further includes a pump 56a for sucking the cultivation liquid L1, more specifically, the waste liquid L10, an imaging device 57a for imaging a cultivation tank 3, and a controller (not illustrated) for controlling each of the connector 53a, the pump 56a, and the imaging device 57a. The discharge device 50 further includes a winder 58a that automatically winds up the hose 55a, and a base 59a. All components of the discharge device 50 except the tank 54a and the base 59a, that is, the nozzle 52a, the connector 53a, the hose 55a, the pump 56a, the imaging device 57a, the winder 58a, and the controller are installed on the base 59a to form a nozzle unit.

The nozzle 52a, the connector 53a, the tank 54a, the hose 55a, the pump 56a, the imaging device 57a, and the controller of the discharge device 50 have the same structure as the discharge nozzle of the nozzle 52, the connector 53, the part of the tank 54 corresponding to the waste liquid reservoir 542, the discharge hose 550, the discharge pump 560, the imaging device 57, and the controller of the discharge/supply device 5 of Embodiment 1.

The winder 58a includes, for example, a drum around which the hose 55a is wound, and biasing means for rotating the drum in a direction in which the hose 55a is wound. The hose 55a can be pulled out of the winder 58a against the biasing force of the biasing means.

A stacker crane 42 included in a conveyance device 4 further includes a nozzle installation part 428 and a tank installation part 429. The nozzle installation part 428 is integrated with a cargo bed 423, and is lifted and lowered together with the cargo bed 423 outside a frame 421. The tank installation part 429 is integrated with the bottom of the frame 421, is positioned outside the frame 421, and travels on a traveling rail 420. The nozzle installation part 428 is positioned above the tank installation part 429. The nozzle installation part 428 forms a lift 41 together with the cargo bed 423. The tank installation part 429 forms a horizontally moving part 40 together with the frame 421. In FIGS. 10 to 12, illustration of a lift device 425 is omitted.

The nozzle unit of the discharge device 50 is detachably installed in the nozzle installation part 428, that is, the lift 41. The tank 54a of the discharge device 50 is detachably installed in the tank installation part 429, that is, the horizontally moving part 40. The nozzle installation part 428 is provided with a fork device (not illustrated) similarly to the cargo bed 423. The fork device provided in the nozzle installation part 428 is smaller than a fork device 424 provided in the cargo bed 423. With this fork device, the nozzle unit of the discharge device 50 can be placed on and off the nozzle installation part 428.

When the stacker crane 42 moves the nozzle unit of the discharge device 50 in the horizontal direction and the vertical direction, the hose 55a is automatically wound by the winder 58a, so that loosening of the hose 55a is prevented. As a result, it is possible to prevent a part of the hose 55a from being sandwiched between the traveling rail 420 and the tank installation part 429 and from colliding with a storage shelf 1 or the frame 421 of the stacker crane 42.

Instead of the discharge device 50, the supply device 51 can be placed on the conveyance device 4.

As illustrated in FIGS. 13 and 14, a part of the structure of the supply device 51 is the same as the structure of the discharge device 50. The supply device 51 includes a nozzle 52b that supplies the cultivation liquid L1, more specifically, a nourishing liquid L11, a connector 53b that connects the nozzle 52b to a connection target, and a hose 55b that connects a tank 7 to be described later and the nozzle 52b. The supply device 51 further includes an imaging device 57b that images the cultivation tank 3, a controller (not illustrated) that controls the connector 53b and the imaging device 57b, a winder 58b that automatically winds the hose 55b, and a base 59b. All other components of the supply device 51, that is, the nozzle 52b, the connector 53b, the hose 55b, the imaging device 57b, the winder 58b, and the controller are installed on the base 59b to form a nozzle unit.

The nozzle 52b, the connector 53b, the hose 55b, the imaging device 57b, the controller, the winder 58b, and the base 59b of the supply device 51 have the same structure as the nozzle 52a, the connector 53a, the hose 55a, the imaging device 57a, the controller, the winder 58a, and the base 59a of the discharge device 50.

In the present embodiment, the supply device 51 does not include a pump. Additionally, the supply device 51 does not have a tank, more specifically, a tank to be conveyed by the conveyance device 4. The supply device 51 may include a small pump such as a vacuum pump in a part of the hose 55b.

The nozzle unit of the supply device 51 is detachably installed in the nozzle installation part 428, that is, the lift 41. With the fork device provided in the nozzle installation part 428, the nozzle unit of the supply device 51 can be placed on and off the nozzle installation part 428.

The cultivation equipment of Embodiment 2 further includes: a tank 7 which is installed in the storage shelf 1 and stores the cultivation liquid L1, more specifically, the nourishing liquid L11; and a supply pipe 70 which is connected to the tank 7 and supplies a new cultivation liquid L1 to the tank 7.

The tank 7 is installed in one of the plurality of storage areas A2 of storage shelf 1. In the present embodiment, the tank 7 is installed in the storage area A2 that is one end in direction D1 and is positioned in the uppermost part among the plurality of storage areas A2 of the storage shelf 1.

The hose 55b is detachably connected to the bottom of the tank 7. Additionally, a downstream end of the supply pipe 70 is detachably connected to the bottom of the tank 7. An upstream end of the supply pipe 70 is connected to a nourishing liquid tank (not illustrated) in which the new cultivation liquid L1, that is, the nourishing liquid L11 is stored. A pump is provided in a part of the supply pipe 70.

Additionally, the tank 7 is provided with a water level sensor (not illustrated). The pump provided in the supply pipe 70 is controlled to switch between driving and stopping according to the detection result of the water level sensor.

As a result, a predetermined amount of the new cultivation liquid L1 supplied from the supply pipe 70, that is, the nourishing liquid L11 can be stored in the tank 7. The cultivation liquid L1 in the tank 7 flows to the nozzle 52b through the hose 55b. As a result, the new cultivation liquid L1 can be ejected from the nozzle 52b.

The supply device 51 further includes a switching mechanism that switches between supply and supply stop of the new cultivation liquid L1 from the nozzle 52b. The switching mechanism is, for example, an electric valve or a pump provided in the nozzle 52b, and is controlled by the controller.

In the cultivation equipment of Embodiment 2, the storage shelf 1 is provided with a standby part 13 on which the nozzle unit of the supply device 51 can be placed. In the present embodiment, the standby part 13 is an extended shelf 130 protruding outward in direction D1 from one end of the storage shelf 1 in direction D1. The standby part 13 may be a part adjacent to the part where the tank 7 is installed in a shelf member 10 of the storage shelf 1 in direction D3 or direction D1, and in this case, the nozzle unit of the supply device 51 is stored in one of storage areas A2.

By installing the supply device 51 in the standby part 13, it is possible to keep the hose 55b of the supply device 51 from hindering conveyance when the cultivation unit 2 is conveyed by the conveyance device 4.

The supply pipe 70 can also be used as a discharge pipe for discharging the cultivation liquid L1 in the tank 7. In this case, a branched branch pipe is provided in a part of the supply pipe 70, specifically, a part closer to the tank 7 than the pump, and a valve is provided in the branch pipe. By stopping the pump and opening the valve, the cultivation liquid L1 in the tank 7 can be discharged to the nourishing liquid tank, for example, through the supply pipe 70. By discharging the cultivation liquid L1 in the tank 7 through supply pipe 70, the tank 7 can be brought into a state where the tank 7 does not contain the cultivation liquid L1. The tank 7 can also be moved by the conveyance device 4 by detaching the hose 55b and the supply pipe 70. As a result, maintenance such as cleaning of the tank 7 can be performed in the work station A1.

2.2 Cultivation Method

Next, a cultivation method for cultivating the plant P1 using the above-described cultivation equipment will be described. Hereinafter, parts different from the cultivation method using the cultivation equipment of Embodiment 1 will be described in detail.

In supply step S20, the stacker crane 42 of the conveyance device 4 moves the nozzle unit of the supply device 51 to the vicinity of the target cultivation unit 2. Next, the cultivation liquid L1 in the tank 7, that is, the nourishing liquid L11 is ejected from the nozzle 52b, and a predetermined amount of the cultivation liquid L1, that is, the nourishing liquid L11 is stored in a tray 30 of the cultivation tank 3 of the target cultivation unit 2. When the ejection, in other words, the supply of the cultivation liquid L1 to the target cultivation unit 2 is completed, the nozzle unit of the supply device 51 is moved from the nozzle installation part 428 of the stacker crane 42 onto the standby part 13.

In discharge step S21, the nozzle unit of the discharge device 50 is installed in the nozzle installation part 428, and the tank 54a of the discharge device 50 is installed in the tank installation part 429. Next, in discharge step S21, the stacker crane 42 of the conveyance device 4 moves the nozzle unit of the discharge device 50 to the vicinity of the target cultivation unit 2, and the nozzle 52a of the discharge device 50 is inserted into the through hole 311 of the planting panel 31 of the cultivation tank 3 of the target cultivation unit 2. Next, a pump 56a of the discharge device 50 is driven to suck the cultivation liquid L1 in the tray 30 of the cultivation tank 3, that is, the waste liquid L10 through the nozzle 52a to send the waste liquid L10 to the tank 54a.

When the tank 54a of the discharge device 50 is filled with the cultivation liquid L1, that is, the waste liquid L10 in discharge step S21, the discharge device 50 is conveyed from the cultivation room 101 to the work room 102 by the conveyance device 4. In the work room 102, the cultivation liquid L1 in the tank 54a, that is, the waste liquid L10 is discharged to the treatment apparatus 6. When suction, in other words, discharge of the cultivation liquid L1 from the target cultivation unit 2 is completed, the nozzle unit of the discharge device 50 is moved from the nozzle installation part 428, and the tank 54a of the discharge device 50 is moved from the tank installation part 429.

In pre-carry-out discharge step S3, the discharge device 50 is used to discharge the cultivation liquid L1 to all of the plurality of cultivation tanks 3 of the target cultivation unit 2 in the same manner as discharge step S21 described above.

Carry-out step S4 is a step of carrying out the target cultivation unit 2 from which the cultivation liquid L1 is discharged from the storage shelf 1 to the work station A1 using the conveyance device 4. Here, as the conveyance device 4, a conveyance device in a state where neither the discharge device 50 nor the nozzle unit of the supply device 51 is installed in the nozzle installation part 428 and the tank 54a of the discharge device 50 is not installed in the tank installation part 429 is used.

2.3 Action and Effect

The cultivation equipment of the present embodiment described above includes the discharge device 50 and the supply device 51 which are movable in the cultivation room 101 and can supply and discharge the cultivation liquid L1 to and from the plurality of cultivation tanks 3 of the plurality of cultivation units 2 in the storage shelf 1.

For this reason, in the cultivation equipment of the present embodiment, there is no need to install a large number of pipes or a large pump for supply or discharge of the cultivation liquid L1 in the storage shelf 1, and it is possible to prevent complication and upsizing of the equipment. Accordingly, in the cultivation equipment of the present embodiment, the storage shelf 1 is easily increased in height, and the harvest amount per unit area is easily increased.

Additionally, in the cultivation equipment of the present embodiment, when the cultivation unit 2 is conveyed between the storage shelf 1 and the work station A1 by the conveyance device 4, a plurality of cultivation tanks 3 of the cultivation unit 2 can be kept in a state where the cultivation tanks 3 do not contain or substantially do not contain the cultivation liquid L1.

Hence, in the cultivation equipment of the present embodiment, the weight of the cultivation unit 2 at the time of conveyance can be curbed, and the load applied to the conveyance device 4 can be curbed. Additionally, in the cultivation equipment of the present embodiment, there is no risk of liquid leakage from the cultivation unit 2 at the time of conveyance. Hence, the conveyance speed of the cultivation unit 2 can be increased, and the harvest amount per unit time can be improved.

Additionally, in the cultivation equipment of the present embodiment, since the discharge device 50 and the supply device 51 can be moved by the conveyance device 4 which conveys the cultivation unit 2, a separate conveyance device is not required, and equipment cost can be kept low.

Additionally, in the cultivation equipment of the present embodiment, the heavy tank 54a in the discharge device 50 only moves horizontally and does not move vertically, so that it is possible to curb the load applied to a lift device (not illustrated) of the stacker crane 42 at the time of conveyance.

Additionally, in the cultivation equipment of the present embodiment, since only a relatively light part of the discharge device 50 other than the tank 54a, that is, only the nozzle unit is lifted and lowered, the lifting and lowering speed of the nozzle unit can be easily improved, and the work efficiency of discharging the cultivation liquid L1 can be enhanced.

Additionally, in the cultivation equipment of the present embodiment, the heavy tank 7 is installed on the storage shelf 1 and does not move, so that it is possible to curb the load applied to the traveling device 426 and the lift device (not illustrated) of the stacker crane 42 at the time of conveyance.

Additionally, in the cultivation equipment of the present embodiment, only the nozzle unit of the supply device 51 which is lighter than the tank 7 is lifted and lowered, so that the lifting and lowering speed of the nozzle unit can be easily improved, and the work efficiency of supplying the cultivation liquid L1 can be enhanced.

Additionally, in the cultivation equipment of the present embodiment, since the new cultivation liquid L1, that is, the nourishing liquid L11 can be automatically supplied from the supply pipe 70 into the tank 7, movement of the tank 7 by the conveyance device 4 is unnecessary, and the conveyance efficiency can be improved accordingly.

Additionally, in the cultivation equipment of the present embodiment, since the tank 7 is disposed in the storage area A2 at the uppermost part of the storage shelf 1, the weight of the new cultivation liquid L1, that is, the nourishing liquid L11 stored in the tank 7 can be used when the new cultivation liquid L1 is sent from the tank 7 to the nozzle 52b, and the pump can be omitted or downsized.

2.4 Modification

The cultivation equipment of Embodiment 2 described above can adopt the following modifications.

The cultivation equipment of Embodiment 2 can adopt modifications similar to the cultivation equipment of Embodiment 1 described above.

Additionally, the discharge device 50 illustrated in FIG. 12 may further have a function of supplying a new cultivation liquid L1, that is, the nourishing liquid L11, similarly to the discharge/supply device 5 of Embodiment 1. Additionally, the supply device 51 and the tank 7 illustrated in FIGS. 13 and 14 may further have a function of discharging the cultivation liquid L1, that is, the waste liquid L10, similarly to the discharge/supply device 5 of Embodiment 1. In these cases, the cultivation equipment of Embodiment 2 only needs to include one of the discharge device 50 or the supply device 51 and tank 7.

3. Summary

As in the cultivation equipment of the above-described embodiments and modifications thereof, the cultivation equipment of a first aspect has the following configuration.

That is, the cultivation equipment of the first aspect includes a storage shelf (1), and a plurality of cultivation tanks (3) that are stored in the storage shelf (1) and hold plants (P1) and a cultivation liquid (L1). The cultivation equipment of the first aspect further includes a discharge device (50) and a supply device (51). The discharge device (50) is movable among a plurality of cultivation tanks (3), and discharges the cultivation liquid (L1) from each of the plurality of cultivation tanks (3). The supply device (51) is movable among the plurality of cultivation tanks (3), and supplies the cultivation liquid (L1) to each of the plurality of cultivation tanks (3).

In the cultivation equipment of the first aspect having the above-mentioned configuration, with respect to each of the cultivation tanks (3) stored in the storage shelf (1), the cultivation liquid (L1) in each of the cultivation tanks (3) can be discharged by the discharge device (50), and the cultivation liquid (L1) can be supplied to each of the cultivation tanks (3) by the supply device (51). Hence, in the cultivation equipment of the first aspect, there is no need to install a large number of pipes or a large pump for supplying or discharging the cultivation liquid (L1) in the storage shelf (1). Hence, it is possible to prevent complication and upsizing of the equipment, so that the storage shelf (1) is easily increased in height, and the harvest amount per unit area is easily increased. Additionally, in the cultivation equipment of the first aspect, when the plurality of cultivation tanks (3) are conveyed between the work station (A1) for performing various works and the storage shelf (1), the plurality of cultivation tanks (3) can be kept in a state where the cultivation tanks (3) do not contain or substantially do not contain the cultivation liquid (L1). Hence, in the cultivation equipment of the first aspect, the weight of each cultivation tank (3) at the time of conveyance can be reduced, the load of conveyance can be reduced, and also liquid leakage from each cultivation tank (3) at the time of conveyance can be prevented.

Additionally, as in the cultivation equipment of the above-described embodiments and modifications thereof, cultivation equipment of a second aspect also includes the following configuration in addition to the configuration of the cultivation equipment of the first aspect.

That is, the cultivation equipment of the second aspect further includes: a plurality of cultivation units (2) that are stored in the storage shelf (1) and in which a plurality of cultivation tanks (3) are installed; and a conveyance device (4) that conveys at least one cultivation unit (2) of the plurality of cultivation units (2) between the storage shelf (1) and a work station (A1) separated from the storage shelf (1). The discharge device (50) and the supply device (51) are conveyed by the conveyance device (4).

In the cultivation equipment of the second aspect having the above-mentioned configuration, since the discharge device (50) and the supply device (51) can be conveyed by the conveyance device (4) that conveys the cultivation unit (2), a separate conveyance device is not required and equipment cost can be kept low.

Additionally, as in the cultivation equipment of the above-described embodiments and modifications thereof, cultivation equipment of a third aspect also includes the following configuration in addition to the configuration of the cultivation equipment of the second aspect.

That is, in the cultivation equipment of the third aspect, the discharge device (50) and the supply device (51) are configured by one discharge/supply device (5) that performs both discharging and supplying of the cultivation liquid (L1).

In the cultivation equipment of the third aspect having the above-mentioned configuration, it is possible to efficiently discharge and supply the cultivation liquid (L1) as compared with a case where the discharge device (50) and the supply device (51) are provided separately.

Additionally, as in the cultivation equipment of the above-described embodiments and modifications thereof, cultivation equipment of a fourth aspect also includes the following configuration in addition to the configuration of the cultivation equipment of the third aspect.

That is, in the cultivation equipment of the fourth aspect, the conveyance device (4) includes: a horizontally moving part (40) that moves in the horizontal direction; and a lift (41) that is integrated with the horizontally moving part (40) and moves in the vertical direction. The discharge/supply device (5) includes a nozzle (52) that discharges and supplies the cultivation liquid (L1), a connector (53) that connects the nozzle (52) to a connection target, a tank (54) that stores the cultivation liquid (L1), and a hose (55) that connects the tank (54) and the nozzle (52). The nozzle (52), the connector (53), and the tank (54) are installed in the lift (41).

In the cultivation equipment of the fourth aspect having the above-mentioned configuration, the nozzle (52), the connector (53), and the tank (54) of the discharge/supply device (5) can be moved together by the lift (41) of the conveyance device (4). Hence, the distance between the nozzle (52) and the tank (54) can be shortened. For this reason, in the cultivation equipment of the fourth aspect, a time required for moving the cultivation liquid (L1) between the nozzle (52) and the tank (54) can be shortened, and the work efficiency of discharging and supplying the cultivation liquid (L1) can be easily enhanced.

Additionally, as in the cultivation equipment of the above-described embodiments and modifications thereof, cultivation equipment of a fifth aspect also includes the following configuration in addition to the configuration of the cultivation equipment of the second aspect.

That is, in the cultivation equipment of the fifth aspect, the conveyance device (4) includes a horizontally moving part (40) that moves in the horizontal direction, and a lift (41) that is integrated with the horizontally moving part (40) and moves in the vertical direction. The discharge device (50) includes a nozzle (52*a*) that discharges the cultivation liquid (L1), a connector (53*a*) that connects the nozzle (52*a*) to a connection target, a tank (54*a*) that stores the cultivation liquid (L1), and a hose (55*a*) that connects the tank (54*a*) and the nozzle (52*a*). The nozzle (52*a*) and the connector (53*a*) are installed in the lift (41), and the tank (54*a*) is installed in the horizontally moving part (40).

In the cultivation equipment of the fifth aspect having the above-mentioned configuration, the heavy tank (54*a*) in the discharge device (50) only moves horizontally and does not move vertically, so that it is possible to curb the load applied to the conveyance device (4). Further, in the cultivation equipment of the fifth aspect, since the nozzle (52*a*) and the connector (53*a*) that are lighter than the tank (54*a*) in the discharge device (50) are lifted and lowered, the lifting and lowering speed of the nozzle (52*a*) and the connector (53*a*) can be easily improved, and the work efficiency of discharging the cultivation liquid (L1) can be enhanced.

Additionally, as in the cultivation equipment of the above-described embodiments and modifications thereof, cultivation equipment of a sixth aspect also includes the following configuration in addition to the configuration of the cultivation equipment of the second or fifth aspect.

That is, the cultivation equipment of the sixth aspect further includes a tank (7) that is installed in the storage shelf (1) and stores the cultivation liquid (L1), and a supply pipe (70) that is connected to the tank (7) and supplies the cultivation liquid (L1) to the tank (7). The conveyance device (4) includes the horizontally moving part (40) that moves in the horizontal direction, and the lift (41) that is integrated with the horizontally moving part (40) and moves in the vertical direction. The supply device (51) includes a nozzle (52b) that supplies the cultivation liquid (L1), a connector (53b) that connects the nozzle (52b) to a connection target, and a hose (55b) that connects the tank (7) and the nozzle (52b). The lift (41) is provided with the nozzle (52b) and the connector (53b).

In the cultivation equipment of the sixth aspect having the above configuration, the heavy tank (7) is installed in the storage shelf (1) and does not move, so that it is possible to curb the load applied to the conveyance device (4). Additionally, in the cultivation equipment of the sixth aspect, since the nozzle (52b) and the connector (53b) that are lighter than the tank (7) are lifted and lowered, the lifting and lowering speed of the nozzle (52b) and the connector (53b) can be easily improved, and the work efficiency of supplying the cultivation liquid (L1) can be enhanced. Additionally, in the cultivation equipment of the sixth aspect, the cultivation liquid (L1) can be supplied into the tank (7) through the supply pipe (70). Hence, in the cultivation equipment of the sixth aspect, movement of the tank (7) by the conveyance device (4) is unnecessary, and the conveyance efficiency can be improved accordingly.

Additionally, as in the cultivation equipment of the above-described embodiments and modifications thereof, cultivation equipment of a seventh aspect also includes the following configuration in addition to the configuration of the cultivation equipment of any one of the fourth to sixth aspects.

That is, the cultivation equipment of the seventh aspect further includes an imaging device (57, 57a, 57b) that is installed in the lift (41) and images the plurality of cultivation tanks (3).

In the cultivation equipment of the seventh aspect having the above-mentioned configuration, by imaging a plurality of cultivation tanks (3) by using the imaging device (57, 57a, 57b), the growth state of the plants (P1) held in each of the cultivation tanks (3) can be checked at a place separated from the storage shelf (1), such as at the work station (A1). Hence, in the cultivation equipment of the seventh aspect, the cultivation unit (2) can be prevented from being conveyed from the storage shelf (1) to the work station (A1) at an inappropriate timing, and the number of times of conveyance of the cultivation unit (2) can be curbed.

Additionally, as in the cultivation equipment of the above-described embodiments and modifications thereof, cultivation equipment of an eighth aspect also includes the following configuration in addition to the configuration of the cultivation equipment of the sixth aspect.

That is, in the cultivation equipment of the eighth aspect, the storage shelf (1) further includes a standby part (13) in which the nozzle (52b) of the supply device (51) and the connector (53b) can be installed, and the lift (41) includes a moving device that moves the nozzle (52b) and the connector (53b) between the lift (41) and the standby part (13), specifically, a fork device provided in the nozzle installation part (428).

In the cultivation equipment of the eighth aspect including the above-mentioned configuration, when the supply device (51) is not used, the supply device (51) can be installed in the standby part (13). Hence, in the cultivation equipment of the eighth aspect, when the cultivation unit (2) is conveyed by the conveyance device (4), the hose (55b) connecting the nozzle (52b) of the supply device (51) and the tank (7) can be prevented from interfering with the conveyance of the cultivation unit (2).

Additionally, as in the cultivation equipment of the above-described embodiments and modifications thereof, cultivation equipment of a ninth aspect also includes the following configuration in addition to the configuration of the cultivation equipment of any one of the fourth to eighth aspects.

That is, the cultivation equipment of the ninth aspect further includes a treatment apparatus (6) that treats the cultivation liquid (L1) discharged from a tank (54, 54a). The treatment apparatus (6) includes a receiving member (60) that receives the cultivation liquid (L1) discharged from the tank (54, 54a), a contaminant separator (61) that removes contaminants in the cultivation liquid (L1), a filter (62) that filters the cultivation liquid (L1), a sterilizer (63) that sterilizes the filtered cultivation liquid (L1) to obtain a treated liquid (L2), and a treated liquid tank (64) that stores the treated liquid (L2).

In the cultivation equipment of the ninth aspect having the above configuration, the cultivation liquid (L1) collected in the tank (54, 54a) can be treated in a reusable manner using the treatment apparatus (6). In the cultivation equipment of the ninth aspect, the cultivation liquid (L1) collected in the tank (54, 54a) can be regenerated every time using the treatment apparatus (6). Hence, a large treatment apparatus provided in a conventional plant factory becomes unnecessary.

Additionally, as in the cultivation equipment of the above-described embodiments and modifications thereof, cultivation equipment of a tenth aspect also includes the following configuration in addition to the configuration of the cultivation equipment of any one of the second to ninth aspects.

That is, in the cultivation equipment of the tenth aspect, each of the plurality of cultivation units (2) includes: a first unit (25) having a plurality of support plates (20) on which a plurality of cultivation tanks (3) are installed; and a second unit (26) that can be combined with the first unit (25) and has an irradiation device (22) that irradiates the plurality of cultivation tanks (3) with grow light. The second unit (26) is fixed to the storage shelf (1), and the first unit (25) is conveyed by the conveyance device (4).

In the cultivation equipment of the tenth aspect having the above configuration, it is possible to convey only the first unit (25) in which the plurality of cultivation tanks (3) are installed among the cultivation units (2), and the second unit (26) including the irradiation device (22) can be left in the storage shelf (1). Hence, in the cultivation equipment of the tenth aspect, there is no need to provide a structure for performing wireless power transfer, for example, in the storage shelf (1) and the cultivation unit (2), and equipment cost can be kept low.

Additionally, as in the cultivation equipment of the above-described embodiments and modifications thereof, cultivation equipment of an 11th aspect also includes the following configuration in addition to the configuration of the cultivation equipment of any one of the fourth to ninth aspects.

That is, in the cultivation equipment of the 11th aspect, each of the plurality of cultivation units (2) includes: a unit tank (27) that stores the cultivation liquid (L1); a supply pipe (28) that connects the unit tank (27) and the plurality of cultivation tanks (3) and supplies the cultivation liquid (L1) in the unit tank (27) to the plurality of cultivation tanks (3); and a discharge pipe (29) that connects the unit tank (27) and the plurality of cultivation tanks (3) and discharges the cultivation liquid (L1) in the plurality of cultivation tanks (3) to the unit tank (27). The connection target of the connector (53, 53a, 53b) is the unit tank (27).

In the cultivation equipment of the 11th aspect having the above-mentioned configuration, when the nozzle (52, 52a, 52b) is connected to the unit tank (27) by the connector (53, 53a, 53b), the cultivation liquid (L1) can be discharged, supplied, or both to and from the plurality of cultivation tanks (3). Hence, in the cultivation equipment of the 11th aspect, as compared with a case where the nozzle (52, 52a, 52b) is sequentially connected to the plurality of cultivation tanks (3) by the connector (53, 53a, 53b) to discharge or supply the cultivation liquid (L1), or both, the work efficiency of discharging or supplying the cultivation liquid (L1) can be enhanced.

Additionally, as in the cultivation method of the above-described embodiments and modifications thereof, a cultivation method of a 12th aspect has the following configuration.

That is, the cultivation method of the 12th aspect includes carry-in step (S1), supply step (S20), and discharge step (S21). In cultivation step (S2), a plurality of cultivation tanks (3) that hold plants (P1) and a cultivation liquid (L1) are stored in a storage shelf (1). In supply step (S20), the cultivation liquid (L1) is supplied to the plurality of cultivation tanks (3) by a supply device (51) movable among the plurality of cultivation tanks (3). In discharge step (S21), the cultivation liquid (L1) in the plurality of cultivation tanks (3) is discharged by a discharge device (50) movable among the plurality of cultivation tanks (3).

In the cultivation method of the 12th aspect having the above-mentioned configuration, with respect to each of the cultivation tanks (3) stored in the storage shelf (1), the cultivation liquid (L1) in each of the cultivation tanks (3) can be discharged by the discharge device (50), and the cultivation liquid (L1) can be supplied to each of the cultivation tanks (3) by supply device (51). Hence, in the cultivation method of the 12th aspect, there is no need to install a large number of pipes or a large pump for supplying or discharging the cultivation liquid (L1) in the storage shelf (1). Hence, it is possible to prevent complication and upsizing of the equipment, so that the storage shelf (1) is easily increased in height, and the harvest amount per unit area is easily increased. Additionally, in the cultivation method of the 12th aspect, when the plurality of cultivation tanks (3) are conveyed between the work station (A1) for performing various works and the storage shelf (1), the plurality of cultivation tanks (3) can be kept in a state where the cultivation tanks (3) do not contain or substantially do not contain the cultivation liquid (L1). Hence, in the cultivation method of the 12th aspect, the weight of the plurality of cultivation tanks (3) at the time of conveyance can be reduced, the load of conveyance can be reduced, and also liquid leakage from each cultivation tank (3) at the time of conveyance can be prevented.

Additionally, as in the cultivation method of the above-described embodiments and modifications thereof, a cultivation method of a 13th aspect also includes the following configuration in addition to the configuration of the cultivation method of the 12th aspect.

That is, in the cultivation method of the 13th aspect, movement of the discharge device (50) and the supply device (51) among the plurality of cultivation tanks (3) is performed by the conveyance device (4) that conveys the plurality of cultivation tanks (3) between the storage shelf (1) and the work station (A1) separated from the storage shelf (1).

In the cultivation method of the 13th aspect having the above-mentioned configuration, since the discharge device (50) and the supply device (51) can be moved by the conveyance device (4), a separate dedicated conveyance device is not required, and the equipment cost can be kept low.

While the present disclosure has been described above on the basis of the embodiments illustrated in the accompanying drawings, the present disclosure is not limited to the above embodiments, and appropriate design changes can be made within the intended scope of the present disclosure.

LIST OF REFERENCE NUMERALS 1 storage shelf
2 cultivation unit
20 support plate
22 irradiation device
25 first unit
26 second unit
27 unit tank
28 supply pipe
29 discharge pipe
3 cultivation tank
4 conveyance device
5 discharge/supply device
50 discharge device
51 supply device
52, 52a, 52b nozzle
53, 53a, 53b connector
54, 54a tank
55, 55a, 55b hose
57, 57a, 57b imaging device
6 treatment apparatus
60 receiving member
61 contaminant separator
62 filter
63 sterilizer
64 treated liquid tank
7 tank
70 supply pipe
A1 work station
P1 plant
L1 cultivation liquid
L2 treated liquid
S1 carry-in step
S20 supply step
S21 discharge step

The invention claimed is:

1. Cultivation equipment comprising:
a storage shelf;
a plurality of cultivation tanks that are stored in the storage shelf and hold plants and a cultivation liquid;
a discharge device that is movable among the plurality of cultivation tanks and discharges the cultivation liquid from each of the plurality of cultivation tanks;
a supply device that is movable among the plurality of cultivation tanks and supplies the cultivation liquid to each of the plurality of cultivation tanks; and
a conveyance device that includes a horizontally moving part that moves in a horizontal direction, and a lift that is integrated with the horizontally moving part and moves in a vertical direction, wherein
the discharge device includes:
    a discharge nozzle that discharges the cultivation liquid; and
    a discharge nozzle connector that connects the discharge nozzle to a connection target,
the supply device includes:
    a supply nozzle that supplies the cultivation liquid; and a supply nozzle connector that connects the supply nozzle to a connection target, and the discharge nozzle, the discharge nozzle connector, the supply nozzle and the supply nozzle connector are installed in the lift.

2. The cultivation equipment according to claim 1 further comprising:
a plurality of cultivation units that are stored in the storage shelf and in which the plurality of cultivation tanks are installed, wherein
the conveyance device conveys at least one cultivation unit among the plurality of cultivation units between the storage shelf and a work station separated from the storage shelf, and
the discharge device and the supply device are conveyed by the conveyance device.

3. The cultivation equipment according to claim 2, wherein
the discharge device and the supply device are configured by one discharge/supply device that discharges and supplies the cultivation liquid.

4. The cultivation equipment according to claim 3, wherein
the discharge nozzle and the supply nozzle are configured by one discharge/supply nozzle that discharges and supplies the cultivation liquid,
the discharge nozzle connector and the supply nozzle connector are configured by one discharqe/supply nozzle connector that connects the discharge/supply nozzle to the connection target,
the discharge/supply device includes
the discharge/supply nozzle,
the discharge/supply nozzle connector,
a tank that stores the cultivation liquid, and
a hose that connects the tank and the discharge/supply nozzle; and
the discharge/supply nozzle, the discharge/supply nozzle connector, and the tank are installed in the lift.

5. The cultivation equipment according to claim 4 further comprising an imaging device that is installed in the lift and images the plurality of cultivation tanks.

6. The cultivation equipment according to claim 4 further comprising a treatment apparatus that treats the cultivation liquid discharged from the tank, wherein
the treatment apparatus includes
a receiving member that receives the cultivation liquid discharged from the tank,
a contaminant separator that removes contaminants in the cultivation liquid,
a filter that filters the cultivation liquid,
a sterilizer that sterilizes the filtered cultivation liquid to obtain a treated liquid, and
a treated liquid tank that stores the treated liquid.

7. The cultivation equipment according to claim 4, wherein
each of the plurality of cultivation units includes
a unit tank that stores the cultivation liquid,
a supply pipe that connects the unit tank and the plurality of cultivation tanks, and supplies the cultivation liquid in the unit tank to the plurality of cultivation tanks, and
a discharge pipe that connects the unit tank and the plurality of cultivation tanks, and discharges the cultivation liquid in the plurality of cultivation tanks to the unit tank, and
the connection target of the connector is the unit tank.

8. The cultivation equipment according to claim 2, wherein
the discharge device further includes
a tank that stores the cultivation liquid, and
a hose that connects the tank and the discharge nozzle, and
the tank is installed in the horizontally moving part.

9. The cultivation equipment according to claim 2 further comprising:
a tank that is installed in the storage shelf and stores the cultivation liquid; and
a supply pipe that is connected to the tank and supplies the cultivation liquid to the tank, wherein
the supply device further includes
a hose that connects the tank and the supply nozzle.

10. The cultivation equipment according to claim 9, wherein
the storage shelf further includes a standby part, and
the lift includes a moving device that moves the supply nozzle and the supply nozzle connector between the lift and the standby part.

11. The cultivation equipment according to claim 10, wherein
the supply nozzle and the supply nozzle connector are installed in the standby part.

12. The cultivation equipment according to claim 2, wherein
each of the plurality of cultivation units includes
a first unit that includes a plurality of support plates on which the plurality of cultivation tanks are installed, and
a second unit that is combinable with the first unit and includes an irradiation device that irradiates the plurality of cultivation tanks with grow light,
the second unit is fixed to the storage shelf, and
the first unit is conveyed by the conveyance device.

* * * * *